(12) United States Patent
Aikawa et al.

(10) Patent No.: US 7,360,091 B2
(45) Date of Patent: Apr. 15, 2008

(54) SECURE DATA TRANSFER METHOD OF USING A SMART CARD

(75) Inventors: Makoto Aikawa, Sagamihara (JP); Yutaka Takami, Yokohama (JP); Shinichiro Fukushima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 734 days.

(21) Appl. No.: 10/602,696

(22) Filed: Jun. 25, 2003

(65) Prior Publication Data
US 2004/0025021 A1   Feb. 5, 2004

(30) Foreign Application Priority Data
Jul. 30, 2002   (JP) .............................. 2002-220602

(51) Int. Cl.
G07B 15/00   (2006.01)
H04K 1/00   (2006.01)
H04L 9/00   (2006.01)

(52) U.S. Cl. .......................... 713/172; 705/13; 705/67; 713/186

(58) Field of Classification Search ................ 713/172, 713/186; 705/13, 67
See application file for complete search history.

(56) References Cited

U.S. PATENT DOCUMENTS

| | | | | |
|---|---|---|---|---|
| 4,650,975 A | * | 3/1987 | Kitchener | 235/375 |
| 5,379,344 A | * | 1/1995 | Larsson et al. | 380/251 |
| 5,539,825 A | * | 7/1996 | Akiyama et al. | 705/68 |
| 5,544,246 A | * | 8/1996 | Mandelbaum et al. | 705/65 |
| 5,577,121 A | * | 11/1996 | Davis et al. | 705/67 |
| 5,721,781 A | * | 2/1998 | Deo et al. | 705/67 |
| 6,018,717 A | * | 1/2000 | Lee et al. | 705/13 |
| 6,230,267 B1 | * | 5/2001 | Richards et al. | 713/172 |
| 6,367,011 B1 | * | 4/2002 | Lee et al. | 713/172 |
| 6,779,113 B1 | * | 8/2004 | Guthery | 713/172 |
| 6,810,479 B1 | * | 10/2004 | Barlow et al. | 713/185 |
| 2002/0095587 A1 | * | 7/2002 | Doyle et al. | 713/186 |
| 2004/0025021 A1 | * | 2/2004 | Aikawa et al. | 713/172 |

FOREIGN PATENT DOCUMENTS

| | | |
|---|---|---|
| EP | 1310923 | 5/2003 |
| JP | 06020117 | 1/1994 |
| JP | 10-51440 A | 2/1998 |

(Continued)

*Primary Examiner*—Emmanuel Moise
*Assistant Examiner*—Techane J. Gergiso
(74) *Attorney, Agent, or Firm*—Mattingly, Stanger, Malur & Brundidge, P.C.

(57) ABSTRACT

A smart card and a settlement terminal are provided by which, when common-key cryptography is used for value transfer between smart cards, the security of the whole system can be improved by enabling easy updating of a cryptographic key used for the value transfer. A smart card transmits/receives value data to/from another smart card. The smart card includes an information accumulating unit for accumulating value data, a transfer key used to update the value data, and an update key used to update the transfer key; a communication unit for receiving a transfer key encrypted by use of the update key, the transfer key being transmitted from another smart card; and an arithmetic processing unit for decrypting the encrypted transfer key by use of the update key to update the transfer key accumulated in the information accumulating unit by use of the decrypted transfer key.

5 Claims, 16 Drawing Sheets

FOREIGN PATENT DOCUMENTS

| | | |
|---|---|---|
| JP | 11055242 | 2/1999 |
| JP | 11-289324 A | 10/1999 |
| JP | 2000-92040 A | 3/2000 |
| JP | 2000092040 | 3/2000 |
| JP | 2001111538 | 4/2001 |
| JP | 2001357373 | 12/2001 |
| WO | 0109852 | 2/2001 |

\* cited by examiner

SECURE DATA TRANSFER METHOD OF USING A SMART CARD

BACKGROUND OF THE INVENTION

The present invention relates to a smart card and a settlement terminal that are capable of handling electronic money and points.

In recent years, smart cards have come into widespread use and are being used instead of magnetic cards. This is because smart cards have distinct advantages that the magnetic cards do not have. For example, the storage capacity of a smart card is large; the smart cards comprise an arithmetic unit that can be used for encryption processing; and data stored inside the smart card cannot be easily viewed (the smart cards have a high tamper resistance). If a smart card having such advantages is applied to a settlement system, it is possible to provide higher security than can be obtained with magnetic cards and to provide new services that magnetic cards can not realize.

SUMMARY OF THE INVENTION

An example of a service using a smart card could conceivably be in the transfer of a "value", that is a valuable greater, such as electronic money and points, is stored in a smart card, whereby various kinds of transactions can be made by transferring this value in money or points between the smart cards. To perform such settlement processing, illegal coping and tampering with the value must be prevented. This requires the tamper resistance advantage of a smart card, and communication processing between smart cards which uses encryption.

Here, encryption methods are roughly classified into public-key cryptography and common-key cryptography. The public-key cryptography has the advantage that, even if a cryptographic key is not shared between both parties who communicate with each other, encryption communication is possible. However, in general, the processing speed is slow in comparison with the common-key cryptography. On the other hand, although the use of common-key cryptography enables high-speed encryption, it is necessary to share beforehand a cryptographic key between both parties who are involved in the encryption communication.

It is apparent that, by making the time required for transferring a value between smart cards as short as possible, the usability of the system is improved. Therefore, if common-key cryptography, whose processing speed is high, is selected as the cryptography method used at the time of value transfer, higher usability in the system is ensured. However, if common-key cryptography is used, it is necessary to set the same cryptographic key in all smart cards. This poses the problem that, when updating a cryptographic key to be used for value transfer, it is necessary to update the cryptographic key in all smart cards simultaneously, so that a combination of the cards by which the value transfer is not possible is not created.

An object of the present invention is to provide a smart card and a settlement terminal by which when the common-key cryptography is used for value transfer between smart cards, the security of the whole system can be improved by enabling easy update of a cryptographic key to be used for the value transfer.

According to one aspect of the present invention, there is provided a smart card that transmits/receives value data to/from another smart card, comprising: information accumulating means for accumulating the value data, a transfer key used to update the value data, and an update key used to update the transfer key; communication means for receiving a transfer key encrypted by use of the update key, the transfer key being transmitted from another smart card; and arithmetic processing means for decrypting the encrypted transfer key by use of the update key to update the transfer key accumulated in the information accumulating means by use of the decrypted transfer key.

According to another aspect of the present invention, there is provided a settlement terminal that transmits/receives the value data between a first smart card that accumulates first value data, a first transfer key used to update the first value data, and an update key used to update the first transfer key, and a second smart card that accumulates second value data, a second transfer key used to update the second value data, and an update key used to update the second transfer key, the settlement terminal comprising: first smart-card read/write means whereby, if the first transfer key differs from the second transfer key, the first transfer key encrypted by use of the update key is received from the first smart card; and second smart-card read/write means for transmitting, to the second smart card, a transfer-key update request requesting that the second transfer key of the second smart card is updated to the first transfer key, said transfer-key update request including the first transfer key encrypted by use of the update key.

BRIEF DESCRIPTION OF THE DRAWING

These and other features, objects and advantages of the present invention will become more apparent from the following description when taken in conjunction with the accompanying drawings wherein.

DETAILED DESCRIPTION OF THE PREFERRED EMBODIMENTS

Embodiments according to the present invention will be described below.

Figure 1:
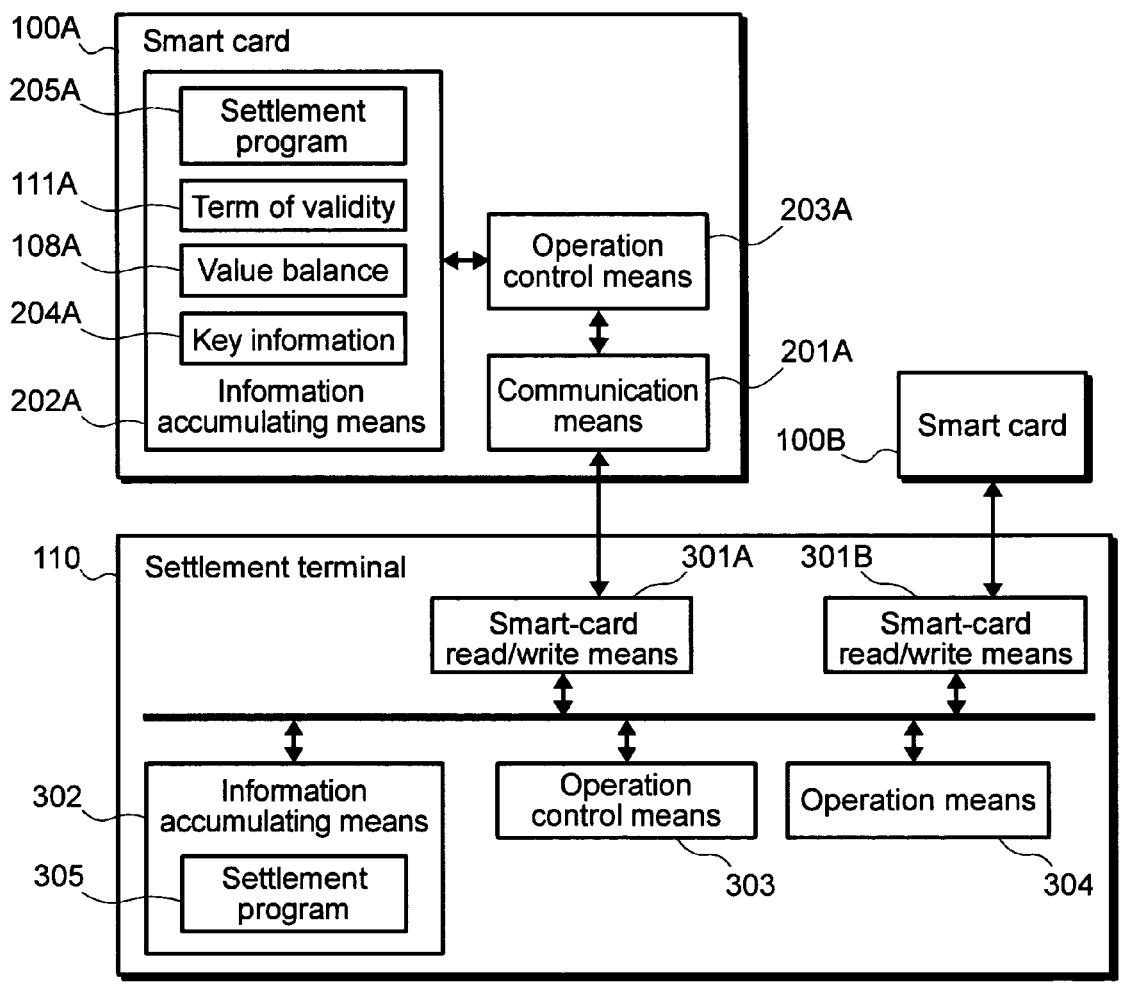
FIG. 1 is a block diagram illustrating components of a value transfer system according to a first embodiment.

To begin with, a first embodiment will be described. FIG. 1 is a block diagram illustrating components of a value transfer system according to this embodiment. In FIG. 1, reference numerals 100A and 100B denote smart cards, and reference numeral 110 denotes a settlement terminal. The settlement terminal 110 is used to perform value transfer between the smart card 100A and the smart card 100B. For example, the settlement terminal 110 could conceivably comprise a portable terminal such as a PDA, a shop terminal, such as a POS terminal, and a finance terminal, such as an ATM.

Next, an example of the internal configuration of the smart card 100A will be described. Incidentally, the internal configuration of the smart card 100B is similar to that of the smart card 100A, and thus its description will be omitted here. The smart card 100A includes a communication means 201A, an information accumulating means 202A, and an operation control means 203A. Here, the communication means 201A has a function of communicating with the settlement terminal 110 so as to receive a command from the settlement terminal 110 and to send a response back to the settlement terminal 110. The information accumulating means 202A has a function of temporarily or permanently storing information obtained from the settlement terminal 110, as well as a program and data that are used to execute services provided by the smart card. The information accumulating means 202A comprises semiconductor memories, such as a ROM (Read Only Memory), a RAN (Random Access Memory), and a flash memory. A microprocessor, which is provided in, the operation control means 203A, has a function of totally controlling the smart card to execute a program stored in the information accumulating means 202A. In addition, the operation control means 203A preferably also includes dedicated hardware circuitry that is used to speed up encryption.

Next, an example of the data and a program included in the information accumulating means 202A will be described. The information accumulating means 202A comprises a term of validity 111A, a value balance 108A, key information 204A, and a settlement program 205A. The term of validity 111A is data representing a term of validity of the smart card 100A. The value balance 108A represents a balance of the value held by the smart card 100A. The key information 204A includes key data used for value transfer. The settlement program 205A is a program used to perform key update and value transfer, and it is executed by the processing means 203A.

Here, smart cards are classified into contact-type smart cards and noncontact-type smart cards according to their communication methods. The specifications of each type are already standardized. For example, the contact-type smart card is standardized as ISO/IEC 7816 by ISO (International Organization for Standardization). In addition, the noncontact-type smart card is standardized in ISO/IEC 14443. A smart card based on ISO/IEC 7816 and ISO/IEC 14443 performs processing for services by internal operation according to a command transmitted from a terminal and a return of its result as a response, both of which are carried out successively. In this case, the command and the response that are transmitted and received between the smart card terminals are defined in ISO/IEC 7816 using a format called APDU (Application Protocol Data Unit). In the present invention, the communication means 201A is within the scope of the standards regardless of whether its method is contact type or noncontact type.

Next, an example of the internal configuration of the settlement terminal 110 will be described. A portable terminal 110 comprises smart card read/write means 301A and 301B, information accumulating means 302, operation control means 303, and operation means 304. The smart-card read/write means 301A has a function of transmitting a command to the smart card 100A and receiving a response from the smart card to communicate with the smart card 100A. Likewise, the smart-card read/write means 301B has a function of communicating with the smart card 10B. In this case, the smart-card read/write means 301A and the smart-card read/write means 301B are within the scope of the present invention regardless of whether its method is based on the contact type or noncontact type. The information accumulating means 302 has a function of accumulating a program and data temporarily or permanently, and it is made up of, for example, a hard disk, a semiconductor memory, etc. The operation control means 303 has a function of totally controlling the settlement terminal 110 by use of a microprocessor according to the program stored in the information accumulating means 302, so that settlement processing is performed. The operation means 304 provides an operator of the settlement terminal 110 with an operational interface with the settlement terminal 110, and it is made up of, for example, a keyboard, a bar-code reader, a display, etc. In addition, the information accumulating means 302 stores a settlement program 305. The settlement program 305 is a program used for key update processing and value transfer processing between the smart card 100A and the smart card 100B, and it is executed by the arithmetic processing means 303.

Figure 2:
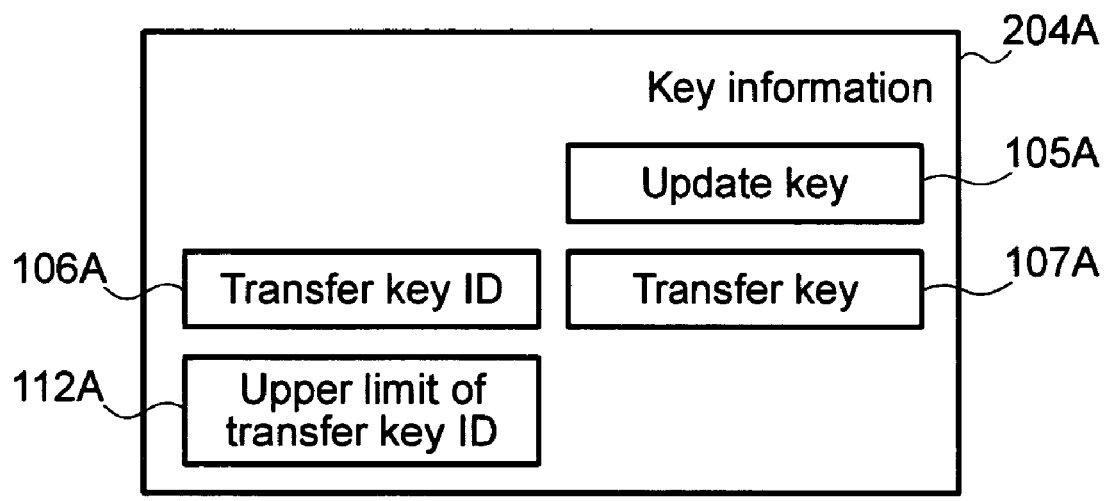
FIG. 2 is a data configuration diagram illustrating key information according to the first embodiment.

Next, FIG. 2 is a diagram illustrating a data configuration of the key information 204A. In FIG. 2, the key information 204A comprises data including an update key 105A, a transfer key ID 106A, a transfer key 107A, and an upper limit of transfer key ID 112A. Incidentally, the smart card 100B has a similar data configuration. Here, the update key 105A is key data to which the common-key cryptography is applied. That is to say, the update key 105A is used to update the transfer key 107A, and it is used when encrypting and decrypting the transfer key 107A. In addition, the transfer key ID 106A is a number used to uniquely identify the transfer key 107A. A judgment is made as to whether the transfer key 107A is newer or older in accordance with whether the value of the transfer key ID 106A is larger or smaller. For example, if the value of a transfer key ID is larger, a transfer key having the transfer key ID is considered to be newer. On the other hand, even if another method of judging whether a transfer key is newer or older is applied, such a method will still fall within the scope of the present invention. In addition, the transfer key 107A is key data used to transfer a value, to which the common-key cryptography is applied. The upper limit of the transfer key ID 112A is data representing an upper limit of the value of the transfer key ID 106A that can be stored in the smart card 100A. Here, so long as common-key cryptography is used, any encryption algorithm that uses the update key 105A and the transfer key 107A is within the scope of the present invention. In this connection, it is assumed that the update key 105A and the transfer key 107A cannot be read from the outside of the smart card 100A.

Next, the process of updating a transfer key between the smart card 100A and the smart card 100B using the settlement terminal 110 will be described in detail. This process is executed before performing value transfer. In addition, the description will be based on the assumption that a command transmitted from the settlement terminal 110 to the smart card 100A and the smart card 100B uses an APDU format. Further, another assumption is that the value of the update key 105A of the smart card 100A is equivalent to the value of the update key 105B of the smart card 100B.

Figure 3:
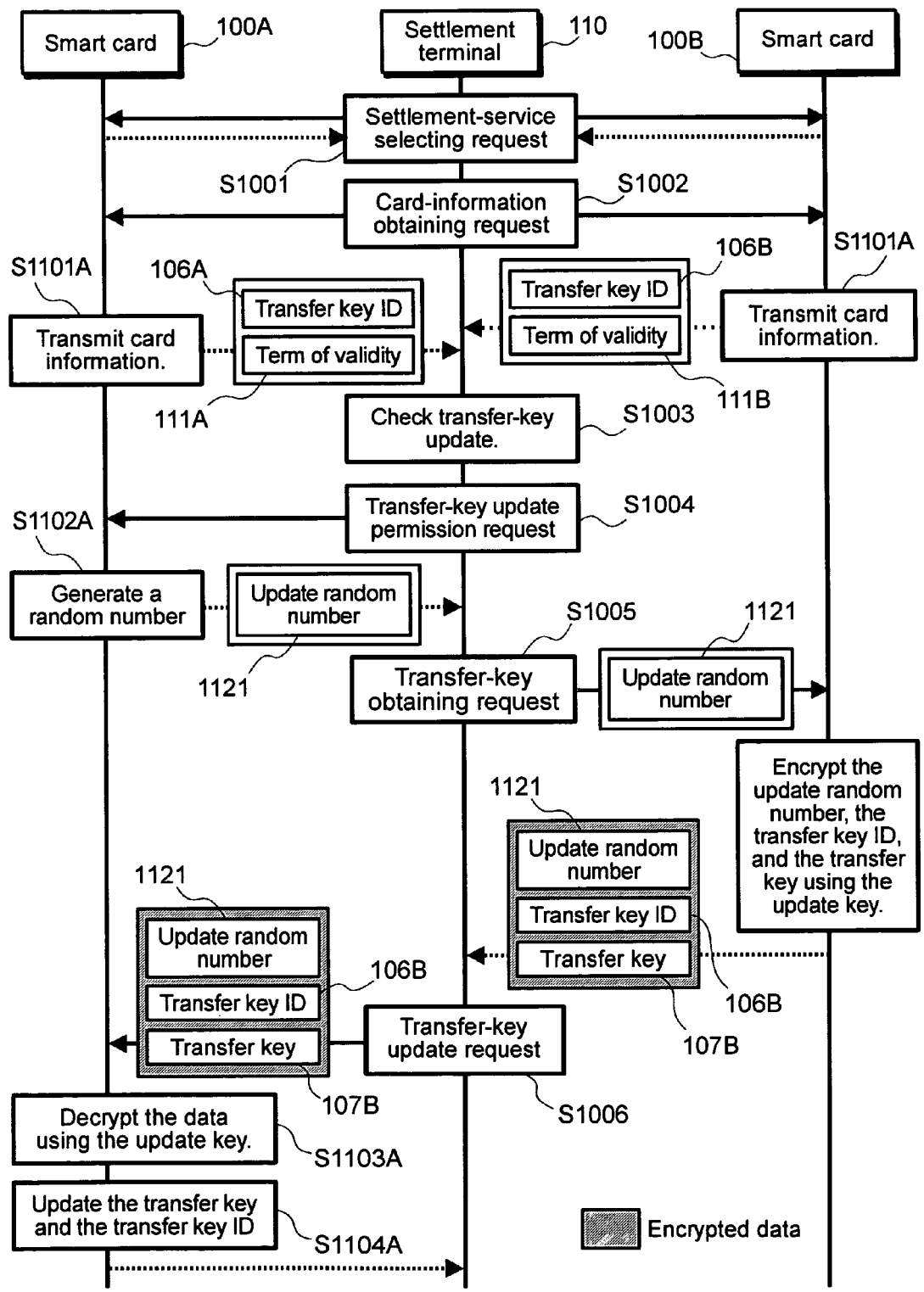
FIG. 3 is a flowchart illustrating transfer key update processing according to the first embodiment.

FIG. 3 is a flowchart illustrating the process of updating a transfer key. To begin with, in a step S1001, the settlement terminal 110 transmits a settlement-service selecting request by use of an APDU command so as to selectively start a settlement service program that is stored in the smart card 100A and the smart card 100B.

Next, in a step S1002, the settlement terminal 110 transmits a card-information obtaining request to the smart card 100A and the smart card 100B by use of an APDU command. In a step S1101A, upon receipt of the card-information obtaining request, the smart card 100A transmits the transfer key ID 106A and the term of validity 111A to the settlement terminal 110 by use of an APDU response. Likewise, in a step S1101B, upon receipt of the card-information obtaining request, the smart card 100B transmits the transfer key ID 106B and the term of validity 111B to the settlement terminal 110 by use of an APDU response.

Next, in a step S1003, the settlement terminal 110 checks the transfer-key update. In this processing, to begin with, the settlement terminal 110 checks the term of validity 111A and the term of validity 111B that have been received, and then judges whether or not the terms of validity have expired. If any of them has expired, the transfer-key update processing is stopped. Next, the settlement terminal 110 compares the received transfer key ID 106A with the received transfer key ID 106B to judge whether or not it is necessary to update the transfer key. If the transfer key ID 106A is newer than the transfer key ID 106B, the transfer key ID 106B and the transfer key 107B of the smart card 100B are updated to the transfer key ID 106A, and the transfer key 107A, respectively, of the smart card 100A. If the transfer key ID 106B is newer than the transfer key ID 106A, the transfer key ID 106A and the transfer key 107A of the smart card 100A are updated to the transfer key ID 106B and the transfer key 107B, respectively, of the smart card 100B. If the transfer key ID 106B is the same as the transfer key ID 106A, the process proceeds to value transfer processing immediately without updating the transfer key after that. FIG. 3 is a flowchart illustrating the processing that is performed when the transfer key ID 106B is newer than the transfer key ID 106A, which will be described below.

Next, in a step S1004, the settlement terminal 110 transmits a transfer-key update permission request to the smart card 100A by use of an APDU command. In a step S1102A, upon receipt of the transfer-key update permission request, the smart card 100A generates an update random number 1121, and then it transmits this to the settlement terminal 110 by use of an APDU response. In this case, the update random number 1121 is used for dynamic authentication that prevents the transfer key 107A of the smart card 100A from being illegally rewritten by a fraudulent card. In this regard, any random-number generation algorithm may be used to generate the update random number 1121 in accordance with the present invention.

Next, in a step S1005, the settlement terminal 110 transmits a transfer-key obtaining request to the smart card 100B by use of an APDU command. This APDU command includes the update random number 1121. In a step S1102B, upon receipt of the update random number 1121 as the transfer-key obtaining request, the smart card 100B encrypts the update random number 1121, the transfer key ID 106B, and the transfer key 107B by use of the update key 105B, and then it transmits this to the settlement terminal 110 by use of an APDU response.

Next, in a step S1006, the settlement terminal 110 transmits a transfer-key update request to the smart card 100A by use of an APDU command. This APDU command includes data produced by encrypting the update random number 1121, the transfer key ID 106B, and the transfer key 107B using the update key 105B. In a step S1103A, upon receipt of the data, as a transfer-key update request, produced by encrypting the update random number 1121, the transfer key ID 106B, and the transfer key 107B using the update key 105B, the smart card 100A decrypts the data using the update key 105A, and then it checks to determine whether or not the decrypted update random number 1121 is a correct value. If the value is not correct, the dynamic authentication is considered to have failed, and, consequently, the transfer-key update processing is stopped. If the value is correct, the dynamic authentication is considered to have succeeded, and then the process proceeds to a step S1104A. In this step, in the first place, a check is made as to whether or not the value of the transfer key ID 106B is between the upper limit of transfer key ID 112A and the value of the transfer key ID 106A. If the check fails, the transfer key is not updated. If the check succeeds, the values of the transfer key ID 106A and the transfer key 107A are updated to values of the transfer key ID 106B and the transfer key 107B, respectively.

In the steps described above, the steps S1001, S1002, S1003, S1004, S1005, and S1006 are performed by the settlement program 305 that is executed by the operation control means 303 of the settlement terminal 110. In addition, the steps S1101A, S1102A, S103A, and S1104A are performed by the settlement program 205A that is executed by the operation control means 203A of the smart card 100A. Moreover, the steps S1101B, S1102B, S1103B, and S1104B are performed by the settlement program 205B that is executed by the operation control means 203B of the smart card 100B.

As a result of the steps described above, the transfer key can be securely updated to a newer value. In addition, because the transfer key is updated using common-key cryptography, it is possible to complete the processing in a short time. Moreover, it is also possible to limit the range of an updateable transfer key using an upper limit of an update key ID.

Figure 4:
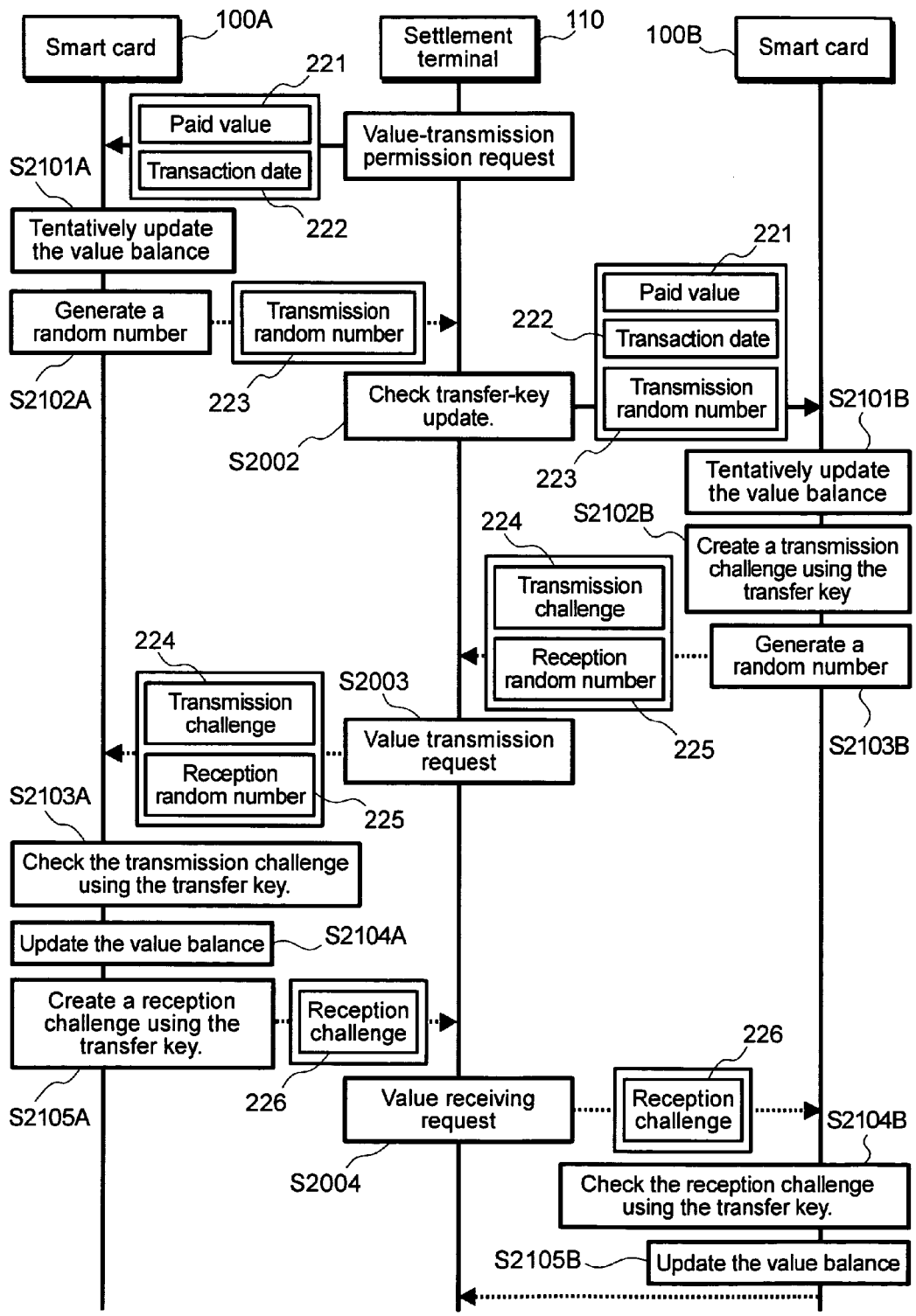
FIG. 4 is a flowchart illustrating value transfer processing.

Next, the process of transferring a value between the smart card 100A and the smart card 100B using the settlement terminal 110 will be described in detail. This processing is performed after the transfer-key update processing described with reference to FIG. 3, and it is based on the assumption that a value of the transfer key 107A is equivalent to that of the transfer key 107B. In addition, the description is based on the assumption that a command transmitted to the smart card 100A and the smart card 100B by the settlement terminal 110 uses an APDU format. FIG. 4 is a flowchart illustrating the process of transferring a value. To begin with, in a step S2001, the settlement terminal 110 transmits an APDU command as a value-transmission permission request to the smart card 100A. This APDU command includes a paid value 221 and the transaction date 222. In this case, the paid value 221 represents a value to be transferred. In addition, the transaction date 222 represents the date and time when the value transfer is to be performed. In a step S2101, upon obtaining the paid value 221 and the transaction date 222 as the value-transmission permission request, the smart card 100A tentatively updates the value balance. To be more specific, a value obtained by subtracting the paid value 221 from the value balance 108A is treated as a value of a tentative value balance. In a step S2102A, a transmission random number 223 is generated, and then the transmission random number 223 is transmitted to the settlement terminal 110 by use of an APDU response. In this case, the transmission random number 223 is used for dynamic authentication that prevents the value balance 108A of the smart card 100A from being rewritten by a fraudulent card. In this regard, any random-number generation algorithm may be used to generate the transmission random number 223 in accordance with the present invention.

Next, in a step S2002, the settlement terminal 110 transmits a value-receive permission request to the smart card 100B by use of an APDU command. This APDU command includes a paid value 221, the transaction date 222, and the transmission random number 223. In a step S2101B, upon receiving the paid value 221, the transaction date 222, and the transmission random number 223 as the value-receive permission request, the smart card 100B tentatively updates the value balance. To be more specific, a value obtained by adding the paid value 221 to the value balance 108B is treated as a value of a tentative value balance. Then, in a step S2102B, a transmission challenge 224 is created. Here, the transmission challenge 224 is an authentication code obtained by encrypting data, into which the paid value 221, the transaction date 222, and the transmission random number 223 are combined, using the transfer key 107B. In accordance with the present invention, any algorithm may be used in generating an authentication code using a transfer key, so the invention is not particularly limited in this regard. For example, the algorithm specified in ISO 9797 can be used. After that, in a step S2103B, the smart card 100B generates a reception random number 225. Then, the transmission challenge 224 and the reception random number 225 are transmitted to the settlement terminal 110 by use of an APDU response. Here, the transmission random number 225 is used for dynamic authentication that prevents the value balance 108B of the smart card 100B from being rewritten by a fraudulent card. In this regard, any random-number generation algorithm may be used to generate the transmission random number 225 in accordance with the present invention.

Next, in a step S2003, the settlement terminal 110 transmits a value transmission request to the smart card 100A as an APDU command. This APDU command includes the transmission challenge 224 and the reception random number 225. In a step S2103A, upon receipt of the transmission challenge 224 and the reception random number 225, the smart card 100A first checks the transmission challenge 224. To be more specific, a check is made as to whether or not an authentication code is equivalent to the transmission challenge 224. The authentication code is obtained by encrypting data, into which the paid value 221, the transaction date 222, and the transmission random number 223 are combined, using the transfer key 107A. If the authentication code is not equivalent to the transmission challenge 224, the dynamic authentication is considered to have failed, and, consequently, the value transfer processing is stopped. If they are equivalent to each other, the dynamic authentication is considered to have succeeded, and, subsequently, the value balance is updated in a step S2104A. To be more specific, the value of the value balance 108A is overwritten by a value obtained by subtracting the paid value 221 from the value balance 108A. After that, in a step S2105A, a reception challenge 226 is created, and then the reception challenge 226 is transmitted to the settlement terminal 110 as an APDU response. Here, the reception challenge 226 is an authentication code obtained by encrypting data, into which the paid value 221, the transaction date 222, and the reception random number 225 are combined, using the transfer key 107A.

Next, in a step S2004, the settlement terminal 110 transmits a value receiving request as an APDU command to the smart card 10B. This APDU command includes a reception challenge 226. In a step S2104B, upon receipt of the reception challenge 226, the smart card 100B first checks the reception challenge 226. More specifically, a check is made as to whether or not an authentication code is equivalent to the reception challenge 226. The authentication code is obtained by encrypting data, into which the paid value 221, the transaction date 222, and the reception random number 225 are combined, using the transfer key 107B. If the authentication code is not equivalent to the reception challenge 226, the dynamic authentication is considered to have failed, and, consequently, the value transfer processing is stopped. If they are equivalent to each other, the dynamic authentication is considered to have succeeded, and, subsequently, the value balance is updated in a step S2105B. To be more specific, the value of the value balance 108B is overwritten by a value obtained by adding the paid value 221 to the value balance 108B. After that, an APDU response is transmitted to the settlement terminal 110.

In the steps described above, the steps S2001, S2002, S2003, S2004 are performed by the settlement program 305 that is executed by the operation control means 303 of the settlement terminal 110. In addition, the steps S2101A, S2102A, S2103A, S2104A, and S2105A are performed by the settlement program 205A that is executed by the operation control means 203A of the smart card 100A. In addition, the steps S2101B, S2102B, S2103B, S2104B, and S2105B are performed by the settlement program 205B that is executed by the operation control means 203B of the smart card 100B.

The steps described above enable secure value transfer between the smart card 100A and the smart card 100B. In this connection, even if the method differs from the steps of value transfer as described with reference to FIG. 4, the method will fall within the scope of the present invention insofar as a value is transferred using a common transfer key in the method.

In the first embodiment according to the present invention, which has been described above, even if a transfer key of the smart card 100A differs from that of the smart card 100B, it is possible to update values of transfer keys in both cards to new values by use of an update key. For example, when changing a smart card whose term of validity expires to a new smart card, also updating a transfer key to a new value permits the value of a transfer key of an old smart card, from which value transfer to this new smart card is performed, to be updated to a new value. As a result, an improvement in security becomes possible.

Figure 5:
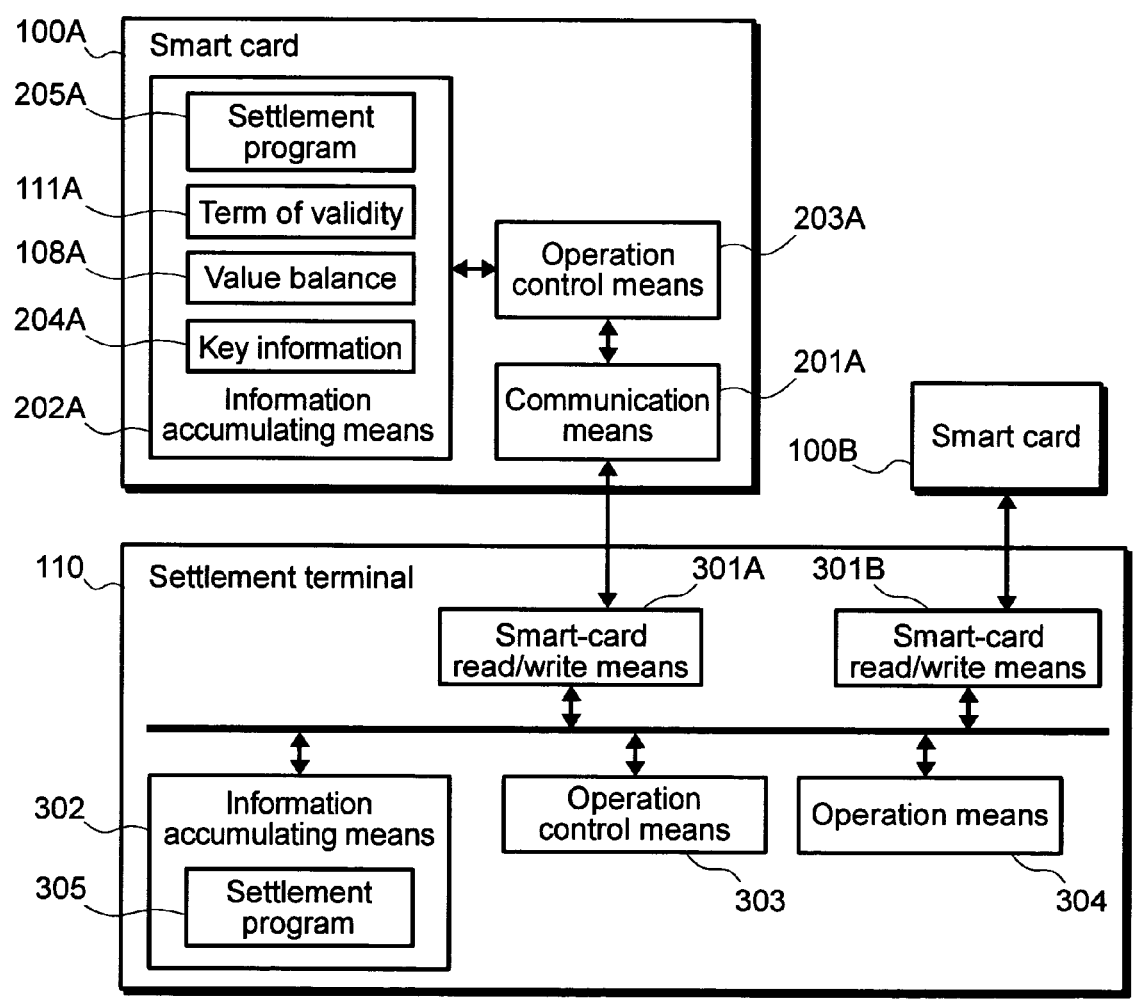
FIG. 5 is a block diagram illustrating components of a value transfer system according to a second embodiment.

Next, a second embodiment according to the present invention will be described. In this embodiment, a transfer key is updated using public-key cryptography. FIG. 5 is a block diagram illustrating components of a value transfer system according to this embodiment, which is the same as the block diagram in FIG. 1 of the first embodiment. Next, the key information 204A of the smart card 100A will be described in detail.

Figure 6:
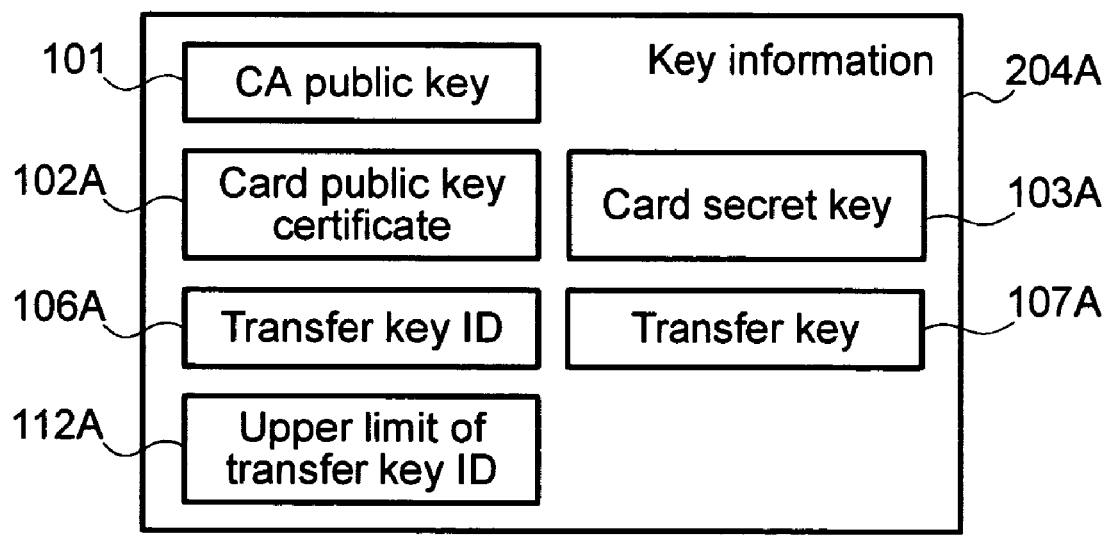
FIG. 6 is a data configuration diagram illustrating key information according to the second embodiment.

FIG. 6 is a diagram illustrating the data configuration of the key information 204A. In FIG. 6, the key information 204A includes a CA public key 101, a card public key certificate 102A, a card secret key 103A, a transfer key ID 106A, a transfer key 107A, and an upper limit of transfer key ID 112A. The key information 204B of the smart card 100B also has a similar data configuration. In this case, the CA public key 101 is a public key of an arbitrary authentication station, and it is used to check the card public key certificate 102A. The card public key certificate 102A is data used to certify the validity of the card public key that is counterpart key data of the card secret key 103A. This card public key is included in the card public key certificate 102A. The card secret key 103A is a secret key to which the public-key cryptography is applied. The card secret key 103A is used to update a transfer key.

In addition, the transfer key ID 106A is a number used to uniquely identify the transfer key 107A. A judgment is made as whether the transfer key 107A is newer or older in accordance with whether the value of the transfer key ID 106A is larger or smaller. For example, if a value of a transfer key ID is larger, a transfer key having the transfer key ID is considered to be newer. In addition, the transfer key 107A is key data used to transfer a value, to which the common-key cryptography is applied. The upper limit of transfer key ID 112A is data representing an upper limit of the value of the transfer key ID 106A that can be stored in the smart card 100A. In this connection, so long as public-key cryptography is used, any encryption algorithm that uses the CA public key 101, the card public key certificate 102A, and the card secret key 103A is within the scope of the present invention. In addition, it is assumed that the card secret key 103A and the transfer key 107A cannot be read from the outside of the smart card 100A.

Figure 7:
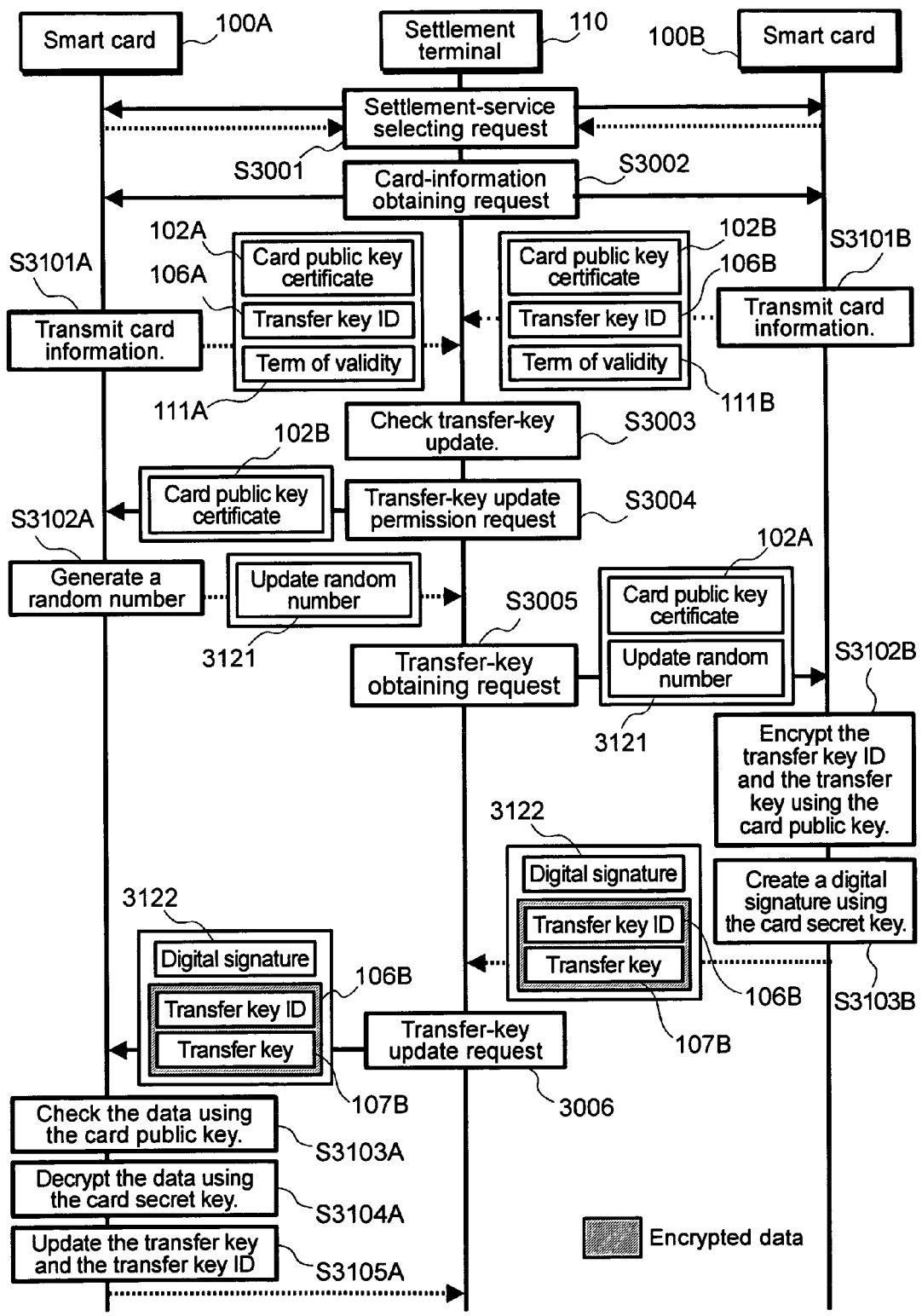
FIG. 7 is a flowchart illustrating transfer key update processing according to the second embodiment.

Next, the process of updating a transfer key according to this embodiment will be described in detail. This processing is executed before performing a value transfer. In addition, the description is based on the assumption that a command transmitted to, the smart card 100A and the smart card 100B by the settlement terminal 110 uses an APDU format. FIG. 7 is a flowchart illustrating the process of updating a transfer key. To begin with, in a step S3001, the settlement terminal 110 transmits a settlement-service selecting request by use of an APDU command so as to select and start a settlement service program that is stored in the smart card 100A and the smart card 100B.

Next, in a step S3002, the settlement terminal 110 transmits a card-information obtaining request to the smart card 100A and the smart card 100B by use of an APDU command. In a step S3101A, upon receipt of the card-information obtaining request, the smart card 100A transmits the card public key certificate 102A, the transfer key ID 106A, and the term of validity 111A to the settlement terminal 110 by use of an APDU response. Likewise, in a step S3101B, upon receipt of the card-information obtaining request, the smart card 100B transmits the card public key certificate 102B, the transfer key ID 106B, and the term of validity 111B to the settlement terminal 110 by use of an APDU response.

Next, in a step S3003, the settlement terminal 110 checks the transfer-key update. In this processing, to begin with, the settlement terminal 110 checks the term of validity 111A and the term of validity 111B that have been received, and then judges whether or not the terms of validity have expired. If any of them have expired, the transfer-key update processing is stopped. Next, the settlement terminal 110 compares the received transfer key ID 106A with the received transfer key ID 106B to judge whether or not it is necessary to update the transfer key. If the transfer key ID 106A is newer than the transfer key ID 106B, the transfer key ID 106B and the transfer key 107B of the smart card 100B are updated to the transfer key ID 106A and the transfer key 107A, respectively, of the smart card 100A. If the transfer key ID 106B is newer than the transfer key ID 106A, the transfer key ID 106A and the transfer key 107A of the smart card 100A are updated to the transfer key ID 106B and the transfer key 107B, respectively, of the smart card 100B. If the transfer key ID 106B is the same as the transfer key ID 106A, the process proceeds to value transfer processing immediately without updating the transfer key after that. FIG. 7 is a flowchart illustrating processing performed when the transfer key ID 106B is newer than the transfer key ID 106A, which will be described below.

Next, in a step S3004, the settlement terminal 110 transmits a transfer-key update permission request to the smart card 100A by use of an APDU command. This APDU command includes the card public key certificate 102B. In a step S3102A, upon receiving the card public key certificate 102B as a transfer-key update permission request, the smart card 100A checks an update card public key certificate 102B by use of the CA public key 101. If the check succeeds, the smart card 100A generates an update random number 3121. Then, the update random number 3121 is transmitted to the settlement terminal 110 by use of an APDU response. In this case, the update random number 3121 is used for dynamic authentication that prevents the transfer key 107A of the smart card 100A from being illegally rewritten by a fraudulent card. In this regard, any random-number generation algorithm may be used to generate the update random number 3121 in accordance with the present invention.

Next, in a step S3005, the settlement terminal 110 transmits a transfer-key obtaining request to the smart card 100B by use of an APDU command. This APDU command includes the card public key certificate 102A and the update random number 3121. In a step S3102B, upon receiving the card public key certificate 102A and the update random number 3121 as a transfer-key obtaining request, the smart card 100B first checks the card public key certificate 102A by use of the CA public key 101. If the check succeeds, the transfer key ID 106B and the transfer key 107B are encrypted using a card public key included in the card public key certificate 102A. Next, in a step S3103B, a digital signature 3122 for data into which the transfer key ID 106B and the transfer key 107B are encrypted and the update random number 3121 are generated using the card secret key 103B. Then, the data into which the transfer key ID 106B and the transfer key 107B are encrypted and the digital signature 3122 are transmitted to the settlement terminal 110 by use of an APDU response. Here, so long as the algorithm of creating the digital signature 3122 is based on public-key cryptography, any algorithm is within the scope of the present invention.

Next, in a step S3006, the settlement terminal 110 transmits a transfer-key update request to the smart card 100A by use of an APDU command. This APDU command includes the digital signature 3122 and the data into which the transfer key ID 106B and the transfer key 107B are encrypted. In a step S3103A, upon receiving the digital signature 3122 and the data into which the transfer key ID 106B and the transfer key 107B are encrypted, as a transfer-key update request, the smart card 100A first checks the digital signature 3122 by use of the card public key 102B. If the check succeeds, the dynamic authentication is considered to have succeeded. Then, in a step S3104A, the transfer key ID 106B and the transfer key 107B are decrypted by use of the card secret key 103A. After that, the process proceeds to a step S3105A. In this step, a check is made as to whether or not the value of the transfer key ID 106B is between the upper limit of transfer key ID 112A and a value of the transfer key ID 106A. If the check fails, the transfer key is not updated. If the check succeeds, the values of the transfer key ID 106A and the transfer key 107A are updated to values of the transfer key ID 106B and the transfer key 107B, respectively.

In the steps described above, the steps S3001, S3002, S3003, S3004, S3005, and S3006 are performed by the settlement program 305 that is executed by the operation control means 303 of the settlement terminal 110. In addition, the steps S3101A, S3102A, S3103A, S3104A, and S3105A are performed by the settlement program 205A that is executed by the operation control means 203A of the smart card 100A. Further, the steps S3101B, S3102B, and S3103B are performed by the settlement program 205B that is executed by the operation control means 203B of the smart card 100B.

As a result of the steps described above, the transfer key can be securely updated to a newer value. In the second embodiment according to the present invention, even if the transfer key of the smart card 100A differs from that of the smart card 100B, it is possible to update the values of the transfer keys in both cards to new values by use of the card public key and the card secret key. For example, when changing a smart card whose term of validity expires to a new smart card, also updating a transfer key to a new value permits the value of a transfer key of an old smart card, from which the value transfer to this new smart card is performed, to be updated to a new value. As a result, an improvement in security becomes possible.

Additionally, because the CA public key and the public key certificate are used in this embodiment, it is also possible to use CRL (Certificate Revocation List) to inhibit value transfer to a smart card holding an invalid public key certificate. Here, the CRL is data produced when the authentication station (CA) attaches an electronic signature to a list of serial numbers of invalid certificates. For example, a case where the settlement terminal 110 holds a CRL and checks the card public key certificate 102A obtained from the smart card 100A and the card public key certificate 102B obtained from the smart card 100B by use of the CRL is also within the scope of the present invention. In addition, the settlement terminal 110 preferably obtains a CRL from the authentication station via a network. Otherwise, when producing the settlement terminal 110, a latest CRL is preferably built into the settlement terminal 110.

Figure 8:
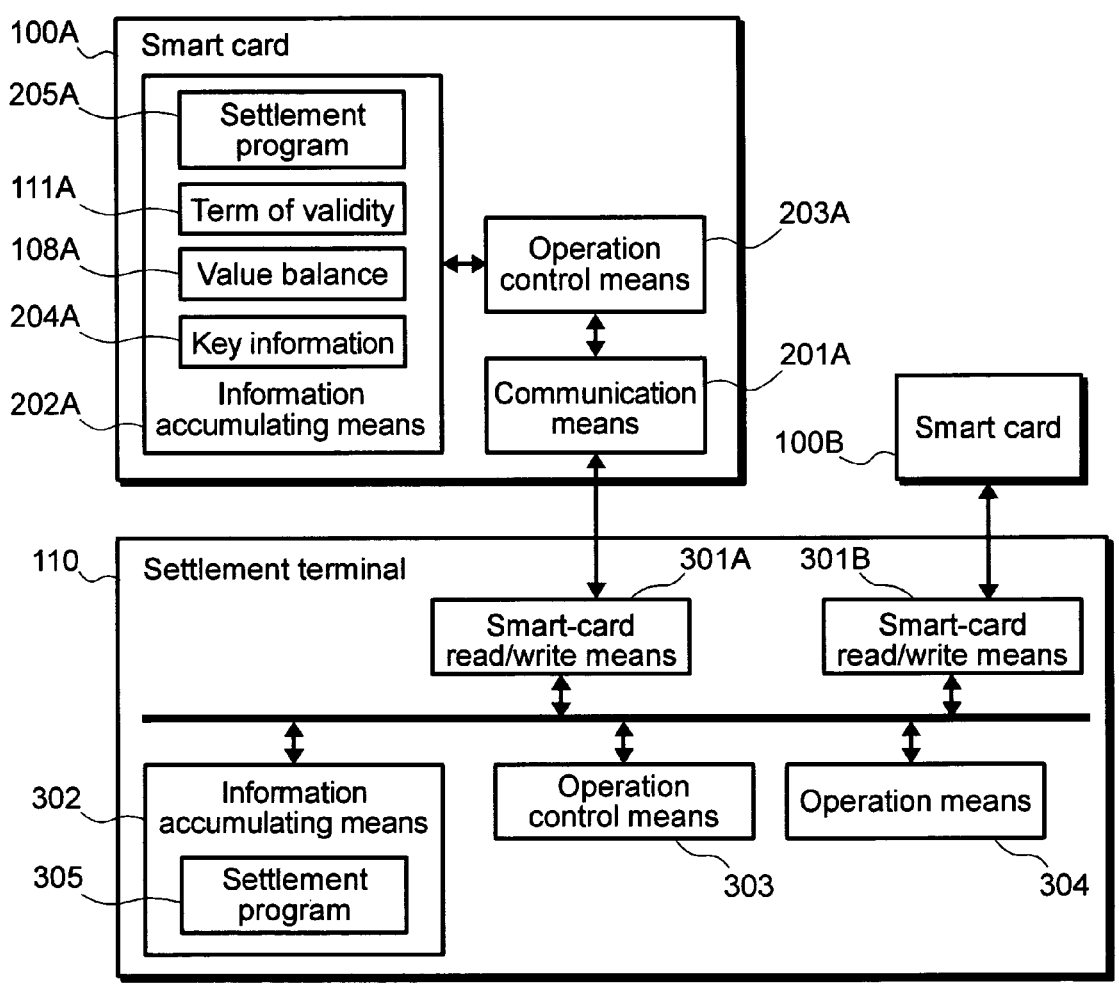
FIG. 8 is a block diagram illustrating components of a value transfer system according to a third embodiment.

Next, a third embodiment according to the present invention will be described. In this embodiment, when updating a transfer key, it is possible to select either common-key cryptography or public-key cryptography. FIG. 8 is a block diagram illustrating components of a value transfer system according to this embodiment. This is the same as the block diagram in FIG. 1 of the first embodiment. Next, key information 204A of a smart card 100A will be described in detail.

Figure 9:
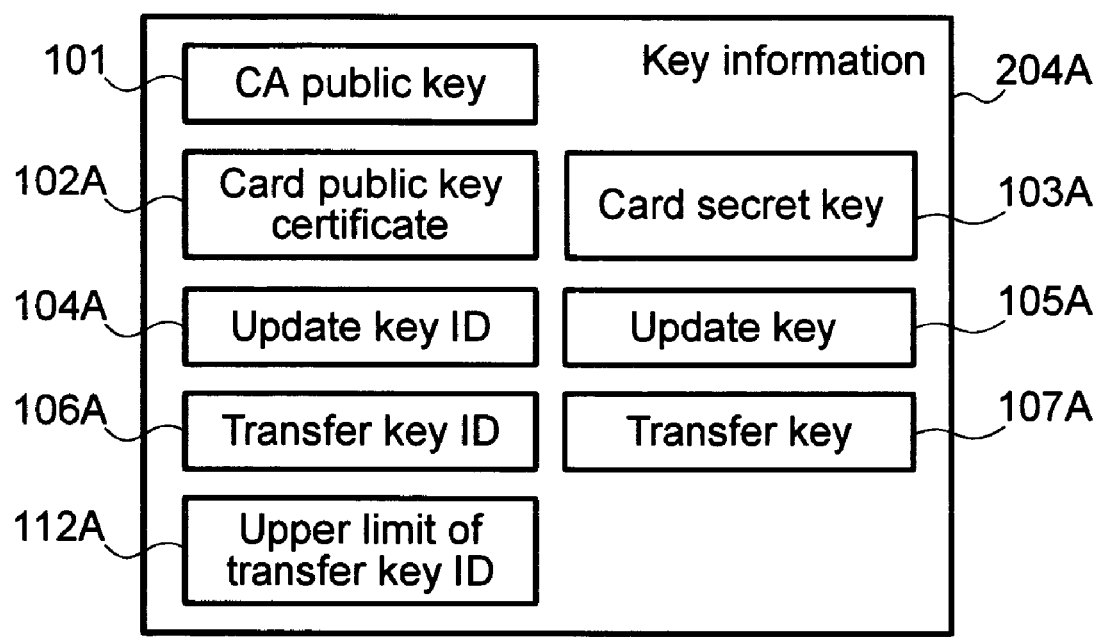
FIG. 9 is a data configuration diagram illustrating key information according to the third embodiment.

FIG. 9 is a diagram illustrating the data configuration of the key information 204A. In FIG. 9, the key information 204A includes a CA public key 101, a card public key certificate 102A, a card secret key 103A, an update key ID 104A, an update key 105A, a transfer key ID 106A, a transfer key 107A, and the upper limit of transfer key ID 112A. It is to be noted that the smart card 100B has a data configuration similar to that of the smart card 100A. In this case, the CA public key 101 is a public key of an arbitrary authentication station, and it is used to check the card public key certificate 102A. The card public key certificate 102A is data used to certify the validity of the card public key that is counterpart key data of the card secret key 103A. This card public key is included in the card public key certificate 102A. The card secret key 103A is a secret key to which the public-key cryptography is applied. The card secret key 103A is used to update a transfer key. In addition, the update key ID 104A is a number used to uniquely identify the update key 105A. Comparing values of update key IDs 104A enables discrimination of a newer update key from an older update key. For example, if a value of an update key ID is larger, an update key having the update key ID is considered to be newer. The update key 105A is key data to which the common-key cryptography is applied. That is to say, the update key 105A is used to update the transfer key 107A, and it is used when encrypting and decrypting the transfer key 107A. In addition, the transfer key ID 106A is a number used to uniquely identify the transfer key 107A. A judgment is made as to whether the transfer key 107A is newer or older in accordance with whether the value of the transfer key ID 106A is larger or smaller. For example, if the value of a transfer key ID is larger, a transfer key having the transfer key ID is considered to be newer. In addition, the transfer key 107A is key data used to transfer a value, to which the common-key cryptography is applied. The upper limit of transfer key ID 112A is data representing an upper limit of the transfer key ID 106A that can be stored in the smart card 100A. Incidentally, so long as common-key cryptography is used, any encryption algorithm that uses the update key 105A and the transfer key 107A is within the scope of the present invention. In addition, so long as public-key cryptography is used, any encryption algorithm that uses the CA public key 101, the card public key certificate 102A, and the card secret key 103A is within the scope of the present invention. In addition, it is assumed that the card secret key 103A, the update key 104A, and the transfer key 107A cannot be read from the outside of the smart card 100A.

Figure 10:
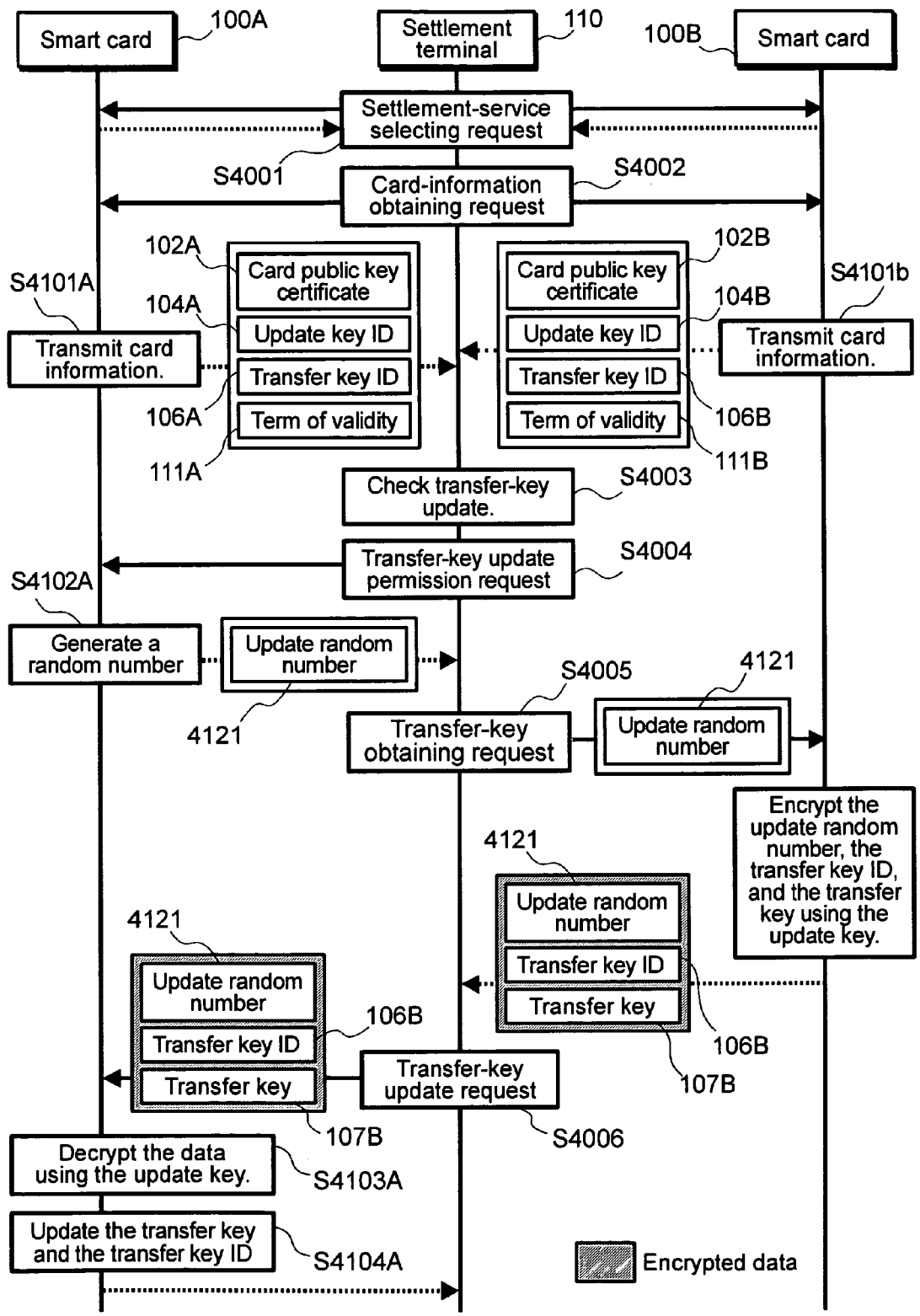
FIG. 10 is a flowchart illustrating transfer key update processing using the common-key cryptography according to the third embodiment.

Next, the process of updating a transfer key according to this embodiment will be described in detail. This processing is executed before performing a value transfer. In addition, the description is based on the assumption that a command transmitted to the smart card 100A and the smart card 100B by the settlement terminal 110 uses an APDU format. FIG. 10 is a flowchart illustrating the process of updating a transfer key. To begin with, in a step S4001, the settlement terminal 110 transmits a settlement-service selecting request by use of an APDU command so as to selectively start a settlement service program that is stored in the smart card 100A and the smart card 100B.

Next, in a step S4002, the settlement terminal 110 transmits a card-information obtaining request to the smart card 100A and the smart card 100B by use of an APDU command. In a step S4101A, upon receipt of the card-information obtaining request, the smart card 100A transmits the card public key certificate 102A, the update key ID 104A, the transfer key ID 106A, and the term of validity 111A to the settlement terminal 110 by use of an APDU response. Likewise, in a step S4101B, upon receipt of the card-information obtaining request, the smart card 100B transmits the card public key certificate 102B, the update key ID 104B, the transfer key ID 106B, and the term of validity 111B to the settlement terminal 110 by use of an APDU response.

Next, in a step S4003, the settlement terminal 110 checks the transfer-key update. In this processing, to begin with, the settlement terminal 110 checks the term of validity 111A and the term of validity 111B that have been received, and then it judges whether or not the terms of validity have expired. If any of them have expired, the transfer-key update processing is stopped. Next, the settlement terminal 110 compares the received transfer key ID 106A with the received transfer key ID 106B to judge whether or not it is necessary to update the transfer key. If the transfer key ID 106A is newer than the transfer key ID 106B, the transfer key ID 106B and the transfer key 107B of the smart card 100B are updated to the transfer key ID 106A and the transfer key 107A, respectively, of the smart card 100A. If the transfer key ID 106B is newer than the transfer key ID 106A, the transfer key ID 106A and the transfer key 107A of the smart card 100A are updated to the transfer key ID 106B and the transfer key 107B, respectively, of the smart card 100B. If the transfer key ID 106B is the same as the transfer key ID 106A, the process proceeds to value transfer processing immediately without updating the transfer key after that. FIG. 10 is a flowchart illustrating processing performed when the transfer key ID 106B is newer than the transfer key ID 106A, which will be described below.

In addition, in the step S4003, if it is judged that the updating of a transfer key is required, then a check is made as to whether or not the update key ID 104A is equivalent to the update key ID 104B. If they are equivalent to each other, the update key 105A and the update key 105B are used for the update processing of the transfer key. If they are not equivalent to each other, the card secret key 103A and the card secret key 103B are used for the update processing of the transfer key. FIG. 10 is a flowchart illustrating processing performed when the update key is used for the update processing of the transfer key, which will be described below.

Next, in a step S4004, the settlement terminal 110 transmits a transfer-key update permission request to the smart card 100A by use of an APDU command. In a step S4102A, as soon as the smart card 100A receives the transfer-key update permission request, the smart card 100A generates an update random number 4121, and then it transmits this to the settlement terminal 110 by use of an APDU response. In this case, the update random number 4121 is used for dynamic authentication that prevents the transfer key 107A of the smart card 100A from being illegally rewritten by a fraudulent card. In this regard, any random-number generation algorithm may be used to generate the update random number 4121 in the accordance with present invention.

Next, in a step S4005, the settlement terminal 110 transmits a transfer-key obtaining request to the smart card 100B by use of an APDU command. This APDU command includes the update random number 4121. In a step S4102B, upon receiving the update random number 4121 as the transfer-key obtaining request, the smart card 100B encrypts the update random number 4121, the transfer key ID 106B, and the transfer key 107B by the update key 105B, and then transmits this to the settlement terminal 110 by use of an APDU response.

Next, in a step S4006, the settlement terminal 110 transmits a transfer-key update request to the smart card 100A by use of an APDU command. This APDU command includes data produced by encrypting the update random number 4121, the transfer key ID 106B, and the transfer key 107B using the update key 105B. In a step S4103A, upon receiving as the transfer-key update request the data produced by encrypting the update random number 4121, the transfer key ID 106B, and the transfer key 107B using the update key 105B, the smart card 100A decrypts the data using the update key 105A, and then it checks whether or not the decrypted update random number 4121 is a correct value. If the value is not correct, the dynamic authentication is considered to have failed, and, consequently, the transfer-key update processing is stopped. If the value is correct, the dynamic authentication is considered to have succeeded, and then the process proceeds to a step S4104A. In this step, a check is made as to whether or not the value of the transfer key ID 106B is between the upper limit of transfer key ID 112A and a value of the transfer key ID 106A. If the check fails, the transfer key is not updated. If the check succeeds, the values of the transfer key ID 106A and the transfer key 107A are updated to values of the transfer key ID 106B and the transfer key 107B, respectively.

In the steps described above, the steps S4001, S4002, S4003, S4004, S4005, and S4006 are performed by the settlement program 305 that is executed by the operation control means 303 of the settlement terminal 110. In addition, the steps S4101A, S4102A, S4103A, and S4104A are performed by the settlement program 205A that is executed by the operation control means 203A of the smart card 100A. Further, the steps S4101B and S4102B are performed by the settlement program 205B that is executed by the operation control means 203B of the smart card 100B.

In the above-mentioned steps, the update key that is key data of the common-key cryptography is used for the update processing of the transfer key. Next, a process flow of processing, in which a card secret key that is key data of the public-key cryptography is used, will be described with reference to FIG. 11. In the process flow shown in FIG. 11, the step S5001 is the same as the step S4001. In addition, the step S5002 is the same as the step S4002. The step S5101A is the same as the step S4101A. Further, the step S5101B is the same as the step S4101B.

Figure 11:
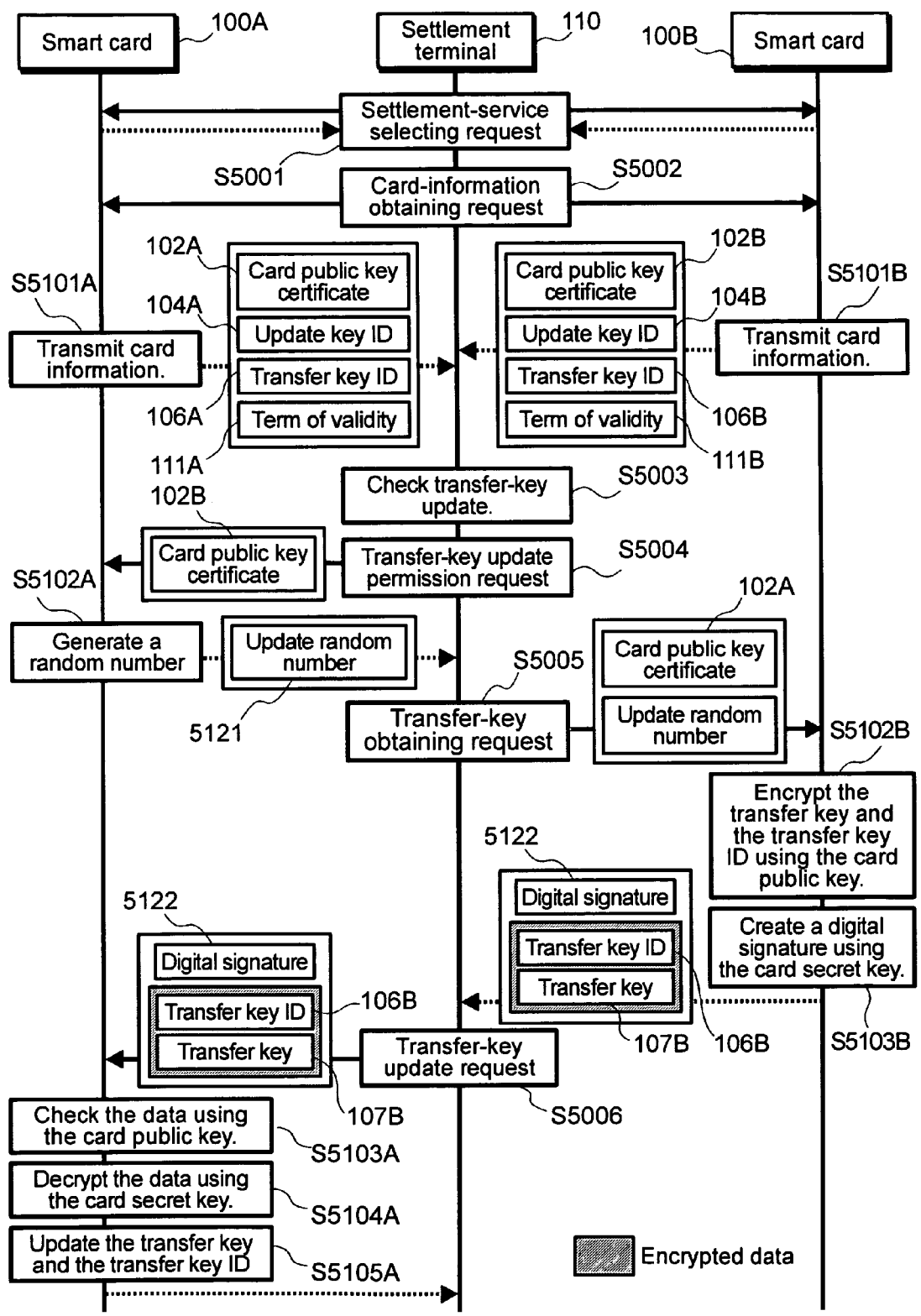
FIG. 11 is a flowchart illustrating transfer key update processing using the public-key cryptography according to the third embodiment.

As is the case with the step S4003, a check is made in the step S5003 as to whether or not the update key ID 104A is equivalent to the update key ID 104B. However, FIG. 11 illustrates a process flow in which the public-key cryptography is used for update processing of a transfer key. Therefore, since the update key ID 104A is not equivalent to the update key ID 104B, the card secret key 103A and the card secret key 103B are used for the update processing of the transfer key. Processing after the step S5003 will be described below.

In a step S5004, the settlement terminal 110 transmits a transfer-key update permission request to the smart card 100A by use of an APDU command. This APDU command includes the card public key certificate 102B. In a step S3102A, upon receiving the card public key certificate 102B as the transfer-key update permission request, the smart card 100A checks an update card public key certificate 102B by use of the CA public key 101. If the check succeeds, the smart card 100A generates an update random number 5121. Then, the update random number 5121 is transmitted to the settlement terminal 110 by use of an APDU response. In this case, the update random number 5121 is used for dynamic authentication that prevents the transfer key 107A of the smart card 100A from being illegally rewritten by a fraudulent card. In this regard, any random-number generation algorithm may be used to generate the update random number 5121 in accordance with the present invention.

Next, in a step S5005, the settlement terminal 110 transmits a transfer-key obtaining request to the smart card 100B by use of an APDU command. This APDU command includes the card public key certificate 102A and the update random number 5121. In a step S5102B, as soon as the smart card 100B receives the card public key certificate 102A and the update random number 5121 as a transfer-key obtaining request, the smart card 100B first checks the card public key certificate 102A by use of the CA public key 101. If the check succeeds, the transfer key ID 106B and the transfer key 107B are encrypted using a card public key included in the card public key certificate 102A. Next, in a step S5103B, a digital signature 5122 for data into which the transfer key ID 106B and the transfer key 107B are encrypted and the update random number 5121 are generated using the card secret key 103B. Then, the data into which the transfer key ID 106B and the transfer key 107B are encrypted and the digital signature 5122 are transmitted to the settlement terminal 110 by use of an APDU response. Here, so long as the algorithm used in creating the digital signature 5122 is based on public-key cryptography, any algorithm is within the scope of the present invention.

Next, in a step S5006, the settlement terminal 110 transmits a transfer-key update request to the smart card 100A by use of an APDU command. This APDU command includes the digital signature 5122, and the data into which the transfer key ID 106B and the transfer key 107B are encrypted. In a step S5103A, upon receiving, as update processing of a transfer key, the digital signature 5122 and the data into which the transfer key ID 106B and the transfer key 107B are encrypted, the smart card 100A first checks the digital signature 5122 by use of the card public key 102B. If the check succeeds, the dynamic authentication is considered to have succeeded. Then, in a step S5104A, the transfer key ID 106B and the transfer key 107B are decrypted by use of the card secret key 103A. After that, the process proceeds to a step S5105A. In this step, a check is made as to whether or not the value of the transfer key ID 106B is between the upper limit of transfer key ID 112A and a value of the transfer key ID 106A. If the check fails, the transfer key is not updated. If the check succeeds, the values of the transfer key ID 106A and the transfer key 107A are updated to values of the transfer key ID 106B and the transfer key 107B, respectively.

In the steps described above, the steps S5001, S5002, S5003, S5004, S5005, and S5006 are performed by the settlement program 305 that is executed by the operation control means 303 of the settlement terminal 110. In addition, the steps S5101A, S5102A, S5103A, S55104A, and S5105A are performed by the settlement program 205A that is executed by the operation control means 203A of the smart card 100A. Further, the steps S5101B, S5102B, and S5103B are performed by the settlement program 205B that is executed by the operation control means 203B of the smart card 100B.

As a result of the steps described above, the transfer key can be securely updated to a newer value. In the third embodiment according to the present invention, even if the transfer key of the smart card 100A differs from that of the smart card 100B, if both cards share the same update key, it is possible to update values of transfer keys in both cards to new values by use of the update key. In addition, even if both cards do not share the same update key, using the card public key and the card secret key enables updating of values of the transfer keys in both cards to new values. For example, when changing a smart card whose term of validity expires to a new smart card, also updating a transfer key to a new value permits the value of a transfer key of an old smart card, from which the value transfer to this new smart card is performed, to be updated to a new value by use of an update key. In this case, since the transfer key is updated using a common-key cryptography, it is possible to complete the processing in a short time. Moreover, when changing to a new smart card, the value of the update key can also be updated to a new value. In this case, although the update key of the old card differs from that of the new card, using the card public key and the card secret key enables updating of the transfer key.

In addition, as described in connection with the second embodiment, because the CA public key and the public key certificate are used in this embodiment, it is also possible to use a CRL to inhibit value transfer to a smart card holding an invalid public key certificate. For example, a case where the settlement terminal 110 holds a CRL and checks the card public key certificate 102A obtained from the smart card 100A and the card public key certificate 102B obtained from the smart card 100B by use of the CRL is also within the scope of the present invention.

Figure 12:
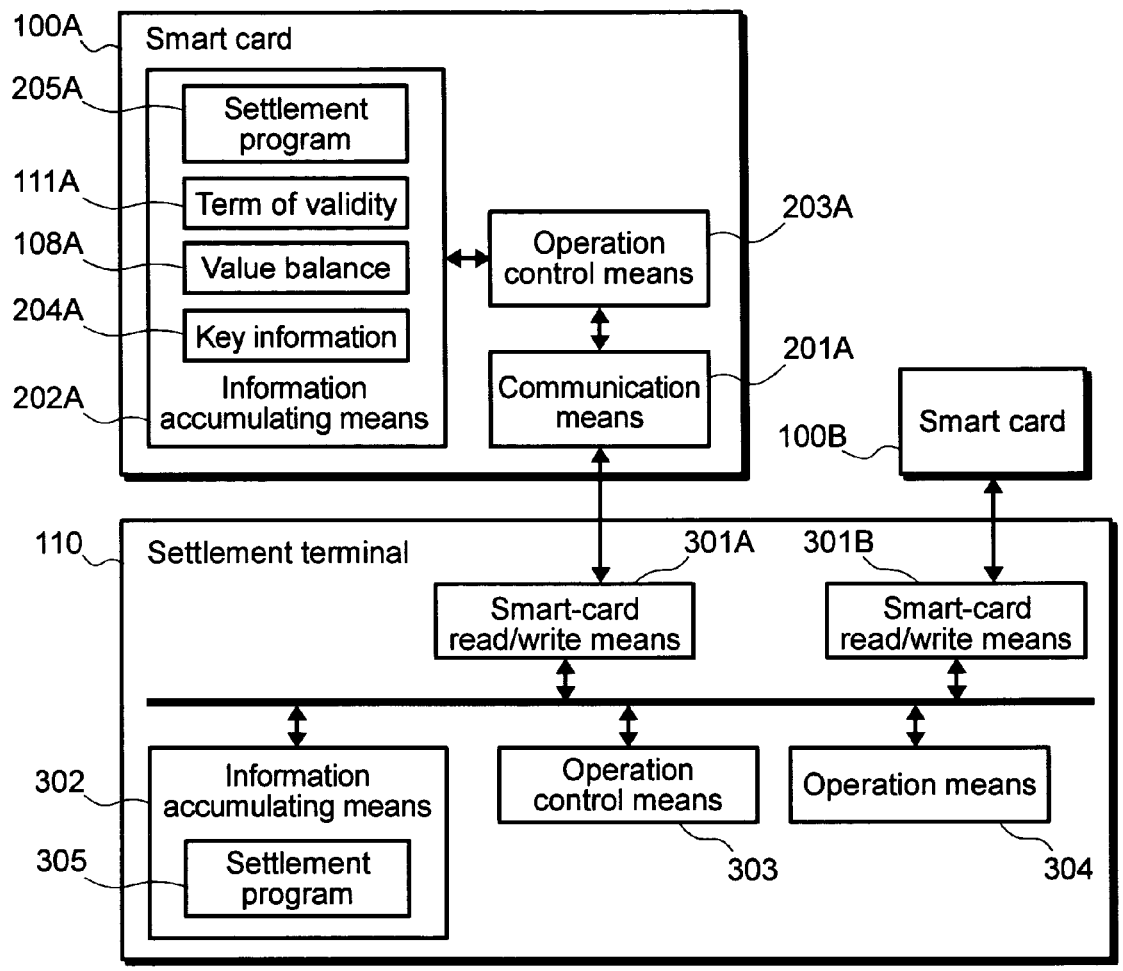
FIG. 12 is a block diagram illustrating components of a value transfer system according to a fourth embodiment.

Next, a fourth embodiment according to the present invention will be described. In this embodiment, each smart card holds a plurality of transfer keys. FIG. 12 is a block diagram illustrating components of a value transfer system according to this embodiment, which is the same as the block diagram in FIG. 1 of the first embodiment. Next, the key information 204A of a smart card 100A will be described in detail.

Figure 13:
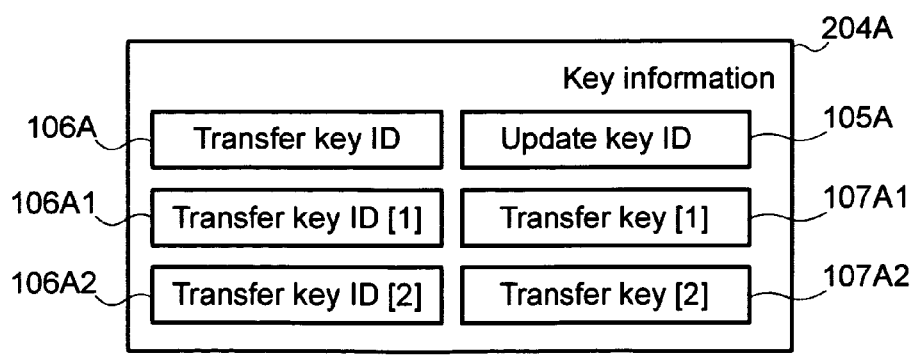
FIG. 13 is a data configuration diagram illustrating key information according to the fourth embodiment.

FIG. 13 is a diagram illustrating the data configuration of the key information 204A. In FIG. 13, the key information 204A includes an update key 105A, a transfer key ID 106A, a transfer key 107A, a transfer key ID[1] 106A1, a transfer key ID[2] 106A2, a transfer key [1] 107A1, a transfer key [2] 107A2, a value balance 108B, and a term of validity 111A. It is to be noted that a smart card 100B also has a data configuration similar to that of the smart card 100A. Here, the update key 105A is key data to which the common-key cryptography is applied. That is to say, the update key 105A is used to update the transfer key 107A, and it is used when encrypting and decrypting the transfer key 107A. In addition, the transfer key ID 106A is a number used to uniquely identify the transfer key 107A. A judgment is made as to whether the transfer key 107A is newer or older in accordance with whether the value of the transfer key ID 106A is larger or smaller. For example, if a value of a transfer key ID is larger, a transfer key having the transfer key ID is considered to be newer. In addition, the transfer key ID[1] 106A1 is a number used to uniquely identify the transfer key [1] 107A1. Further, the transfer key ID[2] 106A1 is a number used to uniquely identify the transfer key [2] 107A1. Additionally, the transfer key [1] 107A1 and the transfer key [2] 107A2 are key data used to transfer a value, the common-key cryptography being applied to the key data. In this embodiment, the value of the transfer key ID 106A is either a value of the transfer key ID [1] 106A1 or that of the transfer key ID[2] 106A2, which represents an ID of a transfer key that is currently used. For example, if a value of the transfer key ID 106A is equivalent to a value of the transfer key ID[1] 106A1, the transfer key [1] 107A1 is used for the value transfer. In this connection, it is assumed that the update key 105B, the transfer key [1] 107A1, and the transfer key [2] 107 cannot be read from the outside. Moreover, in FIG. 13, the number of transfer keys held by the smart card is two. However, a case where more than two transfer keys are held is also within the scope of the present invention.

Figure 14:
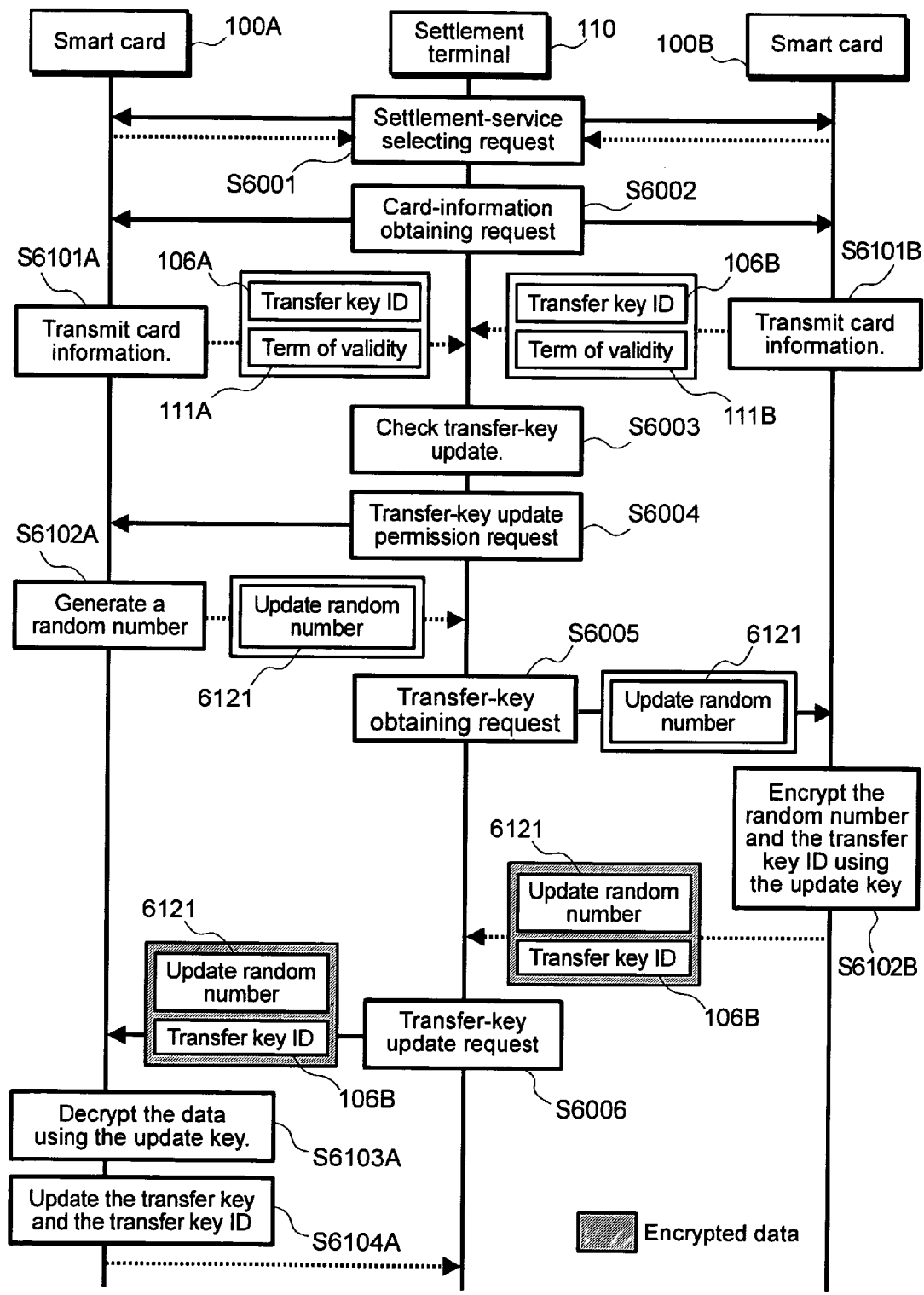
FIG. 14 is a flowchart illustrating transfer key update processing according to the fourth embodiment.

Next, the process of updating a transfer key according to this embodiment will be described in detail. This processing is executed before performing value transfer. In addition, the description is based on the assumption that a command transmitted to the smart card 100A and the smart card 100B by the settlement terminal 110 uses an APDU format. FIG. 14 is a flowchart illustrating the process of updating a transfer key. To begin with, in a step S6001, the settlement terminal 110 transmits a settlement-service selecting request by use of an APDU command so as to selectively start a settlement service program that is stored in the smart card 100A and the smart card 100B.

Next, in a step S6002, the settlement terminal 110 transmits a card-information obtaining request to the smart card 100A and the smart card 100B by use of an APDU command. In a step S6101A, upon receipt of the card-information obtaining request, the smart card 100A transmits the transfer key ID 106A and the term of validity 111A to the settlement terminal 110 by use of an APDU response. Likewise, in a step S6101B, upon receipt of the card-information obtaining request, the smart card 100B transmits the transfer key ID 106B and the term of validity 111B to the settlement terminal 110 by use of an APDU response.

Next, in a step S6003, the settlement terminal 110 checks the transfer-key update. In this processing, to begin with, the settlement terminal 110 checks the term of validity 111A and the term of validity 111B that have been received, and then judges whether or not the terms of validity have expired. If any of them have expired, the transfer-key update processing is stopped. Next, the settlement terminal 110 compares the received transfer key ID 106A with the received transfer key ID 106B to judge whether or not it is necessary to update the transfer key. If the transfer key ID 106A is newer than the transfer key ID 106B, the transfer key ID 106B and the transfer key 107B of the smart card 100B are updated to the transfer key ID 106A, and the transfer key 107A, respectively, of the smart card 100A. If the transfer key ID 106B is newer than the transfer key ID 106A, the transfer key ID 106A and the transfer key 107A of the smart card 100A are updated to the transfer key ID 106B, and the transfer key 107B, respectively, of the smart card 10B. If the transfer key ID 106B is the same as the transfer key ID 106A, the process proceeds to value transfer processing immediately without updating the transfer key after that. FIG. 14 is a flowchart illustrating the processing which is performed when the transfer key ID 106B is newer than the transfer key ID 106A, which process will be described below.

Next, in a step S6004, the settlement terminal 110 transmits a transfer-key update permission request to the smart card 100A by use of an APDU command. In a step S6102A, upon receipt of the transfer-key update permission request, the smart card 100A generates an update random number 6121, and then it transmits this to the settlement terminal 110 by use of an APDU response. In this case, the update random number 6121 is used for dynamic authentication that prevents the transfer key ID 106A of the smart card 100A from being illegally rewritten by a fraudulent card. In this regard, any random-number generation algorithm may be used to generate the update random number 1121 in accordance with the present invention.

Next, in a step S6005, the settlement terminal 110 transmits a transfer-key obtaining request to the smart card 100B by use of an APDU command. This APDU command includes the update random number 6121. In a step S6102B, upon receiving the update random number 6121 as the transfer-key obtaining request, the smart card 100B encrypts the update random number 6121 and the transfer key ID 106B by the update key 105B, and then it transmits this to the settlement terminal 110 by use of an APDU response.

Next, in a step S6006, the settlement terminal 110 transmits a transfer-key update request to the smart card 100A by use of an APDU command. This APDU command includes data produced by encrypting the update random number 6121 and the transfer key ID 106B using the update key 105B. In a step S6103A, upon receiving as a transfer-key update request the data produced by encrypting the update random number 6121 and the transfer key ID 106B using the update key 105B, the smart card 100A decrypts the data using the update key 105A, and then it checks whether or not the decrypted update random number 6121 is a correct value. If the value is not correct, the dynamic authentication is considered to have failed, and, consequently, the transfer-key update processing is stopped. If the value is correct, the dynamic authentication is considered to have succeeded, and then the process proceeds to a step S6104A. In this processing, a check is made as to whether or not the value of the transfer key ID 106B received is newer than that of the transfer key ID 106A, and at the same time is equivalent to either a value of the transfer key ID[1] 106A1 or that of the transfer key ID[2] 106A2. If the check fails, the transfer key is not updated. If the check succeeds, the value of the transfer key ID 106A is overwritten to that of the transfer key ID 106B.

In the steps described above, the steps S6001, S6002, S6003, S6004, S6005, and S6006 are performed by the settlement program 305 that is executed by the operation control means 303 of the settlement terminal 110. In addition, the steps S6101A, S6102A, S6103A, and S6104A are performed by the settlement program 205A that is executed by the operation control means 203A of the smart card 100A. Further, the steps S6101B and S6102B are performed by the settlement program 205B that is executed by the operation control means 203B of the smart card 100B.

As a result of the steps described above, the transfer key can be securely updated to a newer value. In addition, since the transfer key is updated using common-key cryptography, it is possible to complete the processing in a short time.

In the fourth embodiment according to the present invention, which has been described above, a plurality of transfer keys are stored in the smart card 100A and the smart card 100B beforehand. Therefore, it is not necessary to transmit and receive, between the smart cards, a value of the transfer key to be updated. Accordingly, as compared with the other embodiments, further improvement in security can be achieved. As is the case with the first embodiment, the update key is used to update the transfer key in this embodiment. However, as is the case with the second embodiment, even if a card public key and a card secret key are used, this is also within the scope of the present invention. Further, as is the case with the third embodiment, even if an update key, a card public key, a card secret key are used in combination, this is also within the scope of the present invention.

Figure 15:
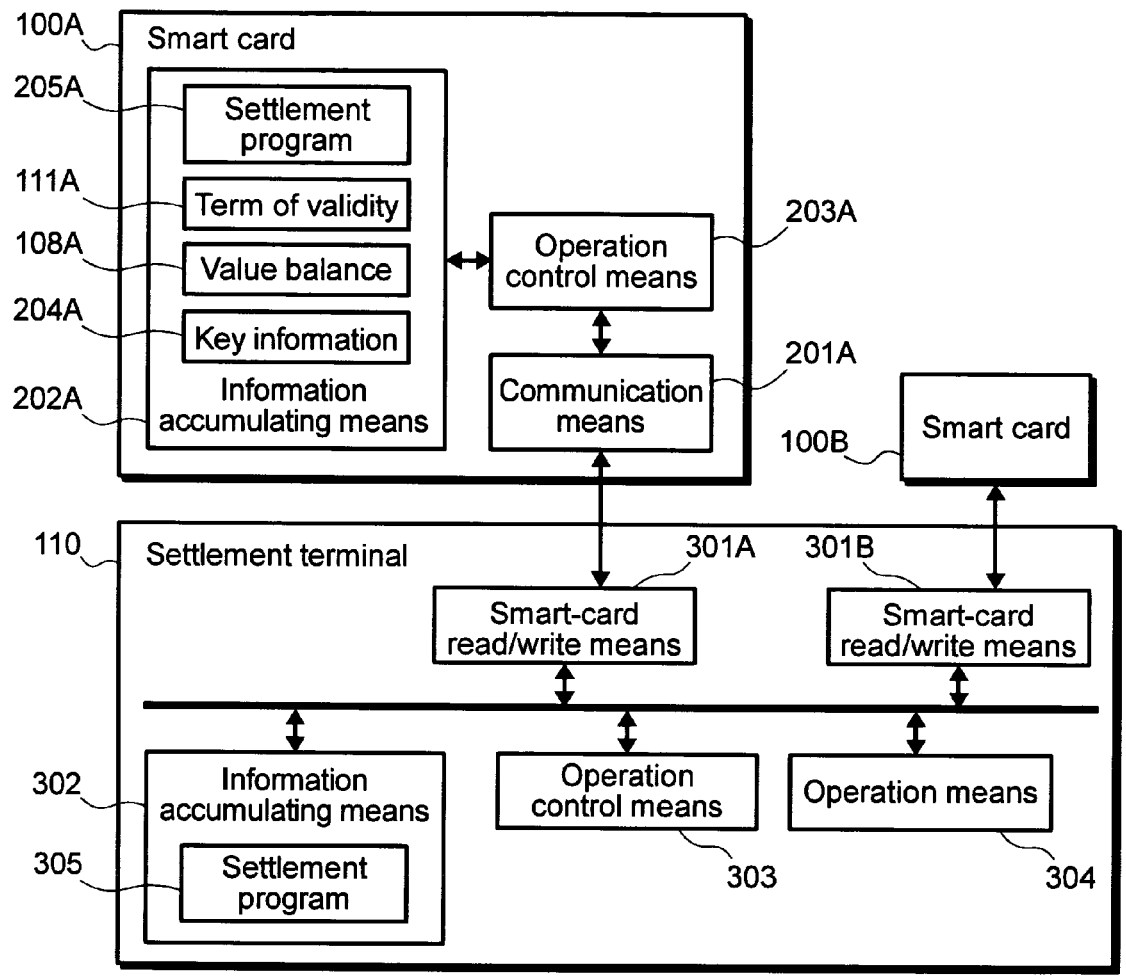
FIG. 15 is a block diagram illustrating components of a value transfer system according to a fifth embodiment.

Next, a fifth embodiment according to the present invention will be described. In this embodiment, when updating a transfer key, it is possible to select either common-key cryptography or public-key cryptography. In addition, if the value of an update key used to update a transfer key differs between smart cards, update processing of the update key is also performed. FIG. 15 is a block diagram illustrating components of a value transfer system according to this embodiment, which is the same as the block diagram in FIG. 1 of the first embodiment. Next, key information 204A of a smart card 100A will be described in detail.

Figure 16:
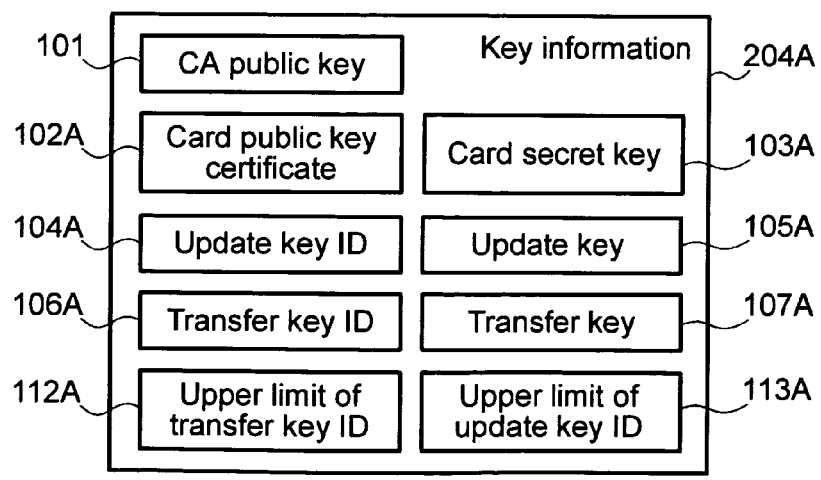
FIG. 16 is a data configuration diagram illustrating key information according to the fifth embodiment.

FIG. 16 is a diagram illustrating the data configuration of the key information 204A. In FIG. 16, the key information 204A includes a CA public key 101, a card public key certificate 102A, a card secret key 103A, an update key ID 104A, an update key 105A, a transfer key ID 106A, a transfer key 107A, a transfer key upper limit 112A, and an upper limit of update key ID 113A. It is to be noted that the smart card 100B also has a data configuration similar to that of the smart card 100A. In this case, the CA public key 101 is a public key of an arbitrary authentication station, and is used to check the card public key certificate 102A. The card public key certificate 102A is data used to certify the validity of the card public key that is counterpart key data of the card secret key 103A. This card public key is included in the card public key certificate 102A. The card secret key 103A is a secret key to which the public-key cryptography is applied. The card secret key 103A is used to update a transfer key. In addition, the update key ID 104A is a number used to uniquely identify the update key 105A. Comparing values of update key IDs 104A enables discrimination of a newer update key from an older update key. For example, if the value of an update key ID is larger, an update key having the update key ID is considered to be newer. The update key 105A is key data to which the common-key cryptography is applied. That is to say, the update key 105A is used to update the transfer key 107A, and it is used when encrypting and decrypting the transfer key 107A. In addition, the transfer key ID 106A is a number used to uniquely identify the transfer key 107A. A judgment is made as to whether the transfer key 107A is newer or older in accordance with whether the value of the transfer key ID 106A is larger or smaller. For example, if the value of a transfer key ID is larger, a transfer key having the transfer key ID is considered to be newer. In addition, the transfer key 107A is key data used to transfer a value, the common-key cryptography being applied to the key data. The upper limit of transfer key ID 112A is data representing an upper limit of the transfer key ID 106A that can be stored in the smart card 100A. The upper limit of update key ID 113A is data representing an upper limit of the update key ID 106A that can be stored in the smart card 100A. In this connection, so long as the common-key cryptography is used, any encryption algorithm that uses the update key 105A and the transfer key 107A is within the scope of the present invention. In addition, so long as public-key cryptography is used, any encryption algorithm that uses the CA public key 101, the card public key certificate 102A, and the card secret key 103A is within the scope of the present invention. Moreover, it is assumed that the card secret key 103A, the update key 104A, and the transfer key 107A cannot be read from the outside of the smart card 100A.

Next, the process of updating a transfer key according to this embodiment will be described in detail.

Figure 17:
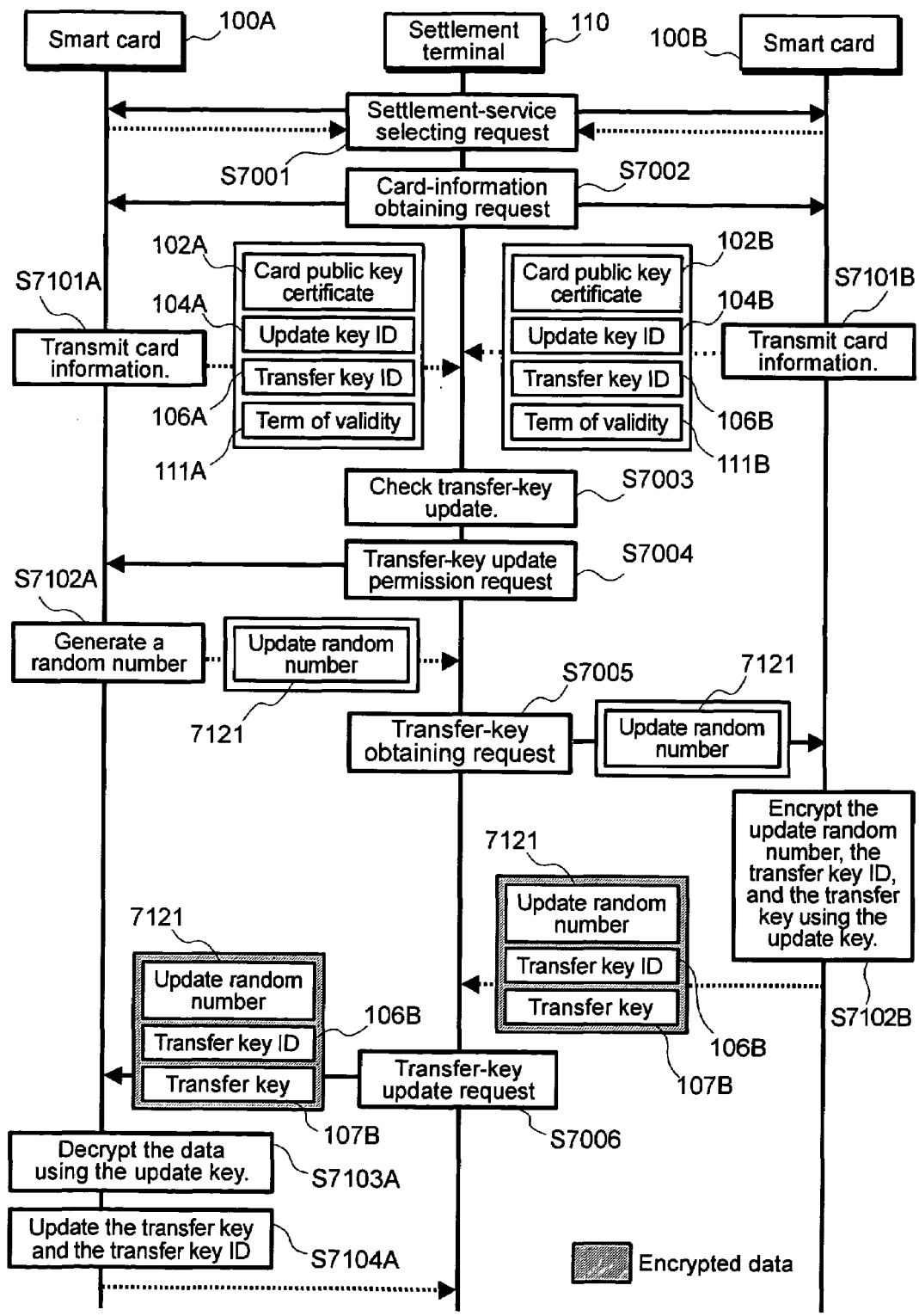
FIG. 17 is a flowchart illustrating transfer key update processing using the common-key cryptography according to the fifth embodiment.

This processing is executed before performing a value transfer. In addition, the description is based on the assumption that a command transmitted to the smart card 100A and the smart card 100B by the settlement terminal 110 uses an APDU format. FIG. 17 is a flowchart illustrating the process of updating a transfer key. To begin with, in a step S7001, the settlement terminal 110 transmits a settlement-service selecting request by use of an APDU command so as to selectively start a settlement service program that is stored in the smart card 100A and the smart card 10B.

Next, in a step S7002, the settlement terminal 110 transmits a card-information obtaining request to the smart card 100A and the smart card 100B by use of an APDU command. In a step S7101A, upon receipt of the card-information obtaining request, the smart card 100A transmits the card public key certificate 102A, the update key ID 104A, the transfer key ID 106A, and the term of validity 111A to the settlement terminal 110 by use of an APDU to response. Likewise, in a step S7101B, upon receipt of the card-information obtaining request, the smart card 100B transmits the card public key certificate 102B, the update key ID 104B, the transfer key ID 106B, and the term of validity 111B to the settlement terminal 110 by use of an APDU response.

Next, in a step S7003, the settlement terminal 110 checks the transfer-key update. In this processing, to begin with, the settlement terminal 110 checks the term of validity 111A and the term of validity 111B that have been received, and then it judges whether or not the terms of validity have expired. If any of them have expired, the transfer-key update processing is stopped. Next, the settlement terminal 110 compares the received transfer key ID 106A with the received transfer key ID 106B to judge whether or not it is necessary to update the transfer key. If the transfer key ID 106A is newer than the transfer key ID 106B, the transfer key ID 106B, and the transfer key 107B, of the smart card 100B are updated to the transfer key ID 106A, and the transfer key 107A, of the smart card 100A. If the transfer key ID 106B is newer than the transfer key ID 106A, the transfer key ID 106A, and the transfer key 107A, of the smart card 100A are updated to the transfer key ID 106B, and the transfer key 107B, of the smart card 100B. If the transfer key ID 106B is the same as the transfer key ID 106A, the process proceeds to value transfer processing immediately without updating the transfer key after that. FIG. 17 is a flowchart illustrating the processing performed when the transfer key ID 106B is newer than the transfer key ID 106A, which processing will be described below.

In addition, in the step S7003, if it is judged that updating of a transfer key is required, then a check is made as to whether or not the update key ID 104A is equivalent to the update key ID 104B. If they are equivalent to each other, the update key 105A and the update key 105B are used for the update processing of the transfer key. If they are not equivalent to each other, the card secret key 103A and the card secret key 103B are used for the update processing of the transfer key and the update key. FIG. 17 is a flowchart illustrating the processing performed when the update key is used for the update processing of the transfer key, which processing will be described below.

Next, in a step S7004, the settlement terminal 110 transmits a transfer-key update permission request to the smart card 100A by use of an APDU command. In a step S7102A, upon receipt of the transfer-key update permission request, the smart card 100A generates an update random number 7121, and then it transmits this to the settlement terminal 110 by use of an APDU response. In this case, the update random number 7121 is used for dynamic authentication that prevents the transfer key 107A of the smart card 100A from being illegally rewritten by a fraudulent card. In this regard, any random-number generation algorithm may be used to generate the update random number 7121 in accordance with the present invention.

Next, in a step S7005, the settlement terminal 110 transmits a transfer-key obtaining request to the smart card 100B by use of an APDU command. This APDU command includes the update random number 7121. In a step S7102B, upon receiving the update random number 7121 as the transfer-key obtaining request, the smart card 100B encrypts the update random number 7121, the transfer key ID 106B, and the transfer key 107B by the update key 105B, and then transmits this to the settlement terminal 110 by use of an APDU response.

Next, in a step S7006, the settlement terminal 110 transmits a transfer-key update request to the smart card 100A by use of an APDU command. This APDU command includes data produced by encrypting the update random number 7121, the transfer key ID 106B, and the transfer key 107B using the update key 105B. In a step S7103A, upon receiving as a transfer-key update request the data produced by encrypting the update random number 7121, the transfer key ID 106B, and the transfer key 107B using the update key 105B, the smart card 100A decrypts the data using the update key 105A, and then it checks whether or not the decrypted update random number 7121 is a correct value. If the value is not correct, the dynamic authentication is considered to have failed, and, consequently, the transfer-key update processing is stopped. If the value is correct, the dynamic authentication is considered to have succeeded, and then the process proceeds to a step S7104A. In this step, a check is made as to whether or not the value of the transfer key ID 106B is between the upper limit of transfer key ID 112A and the value of the transfer key ID 106A. If the check fails, the transfer key is not updated. If the check succeeds, the values of the transfer key ID 106A and the transfer key 107A are updated to values of the transfer key ID 106B and the transfer key 107B, respectively.

In the steps described above, the steps S7001, S7002, S7003, S7004, S7005, and S7006 are performed by the settlement program 305 that is executed by the operation control means 303 of the settlement terminal 110. In addition, the steps S7101A, S7102A, S7103A, and S7104A are performed by the settlement program 205A that is executed by the operation control means 203A of the smart card 100A. Further, the steps S7101B and S7102B are performed by the settlement program 205B that is executed y the operation control means 203B of the smart card 100B.

In the above-mentioned steps, the update key that is key data of the common-key cryptography is used for the update processing of the transfer key. Next, a process flow of processing, in which a card secret key that is key data of the public-key cryptography is used, will be described with reference to FIG. 18. In the process flow shown in FIG. 18, the step S8001 is the same as the step S7001. In addition, the step S8002 is the same as the step S7002. The step S8101A is the same as the step S7101A. The step S8101B is the same as the step S7101B.

Figure 18:
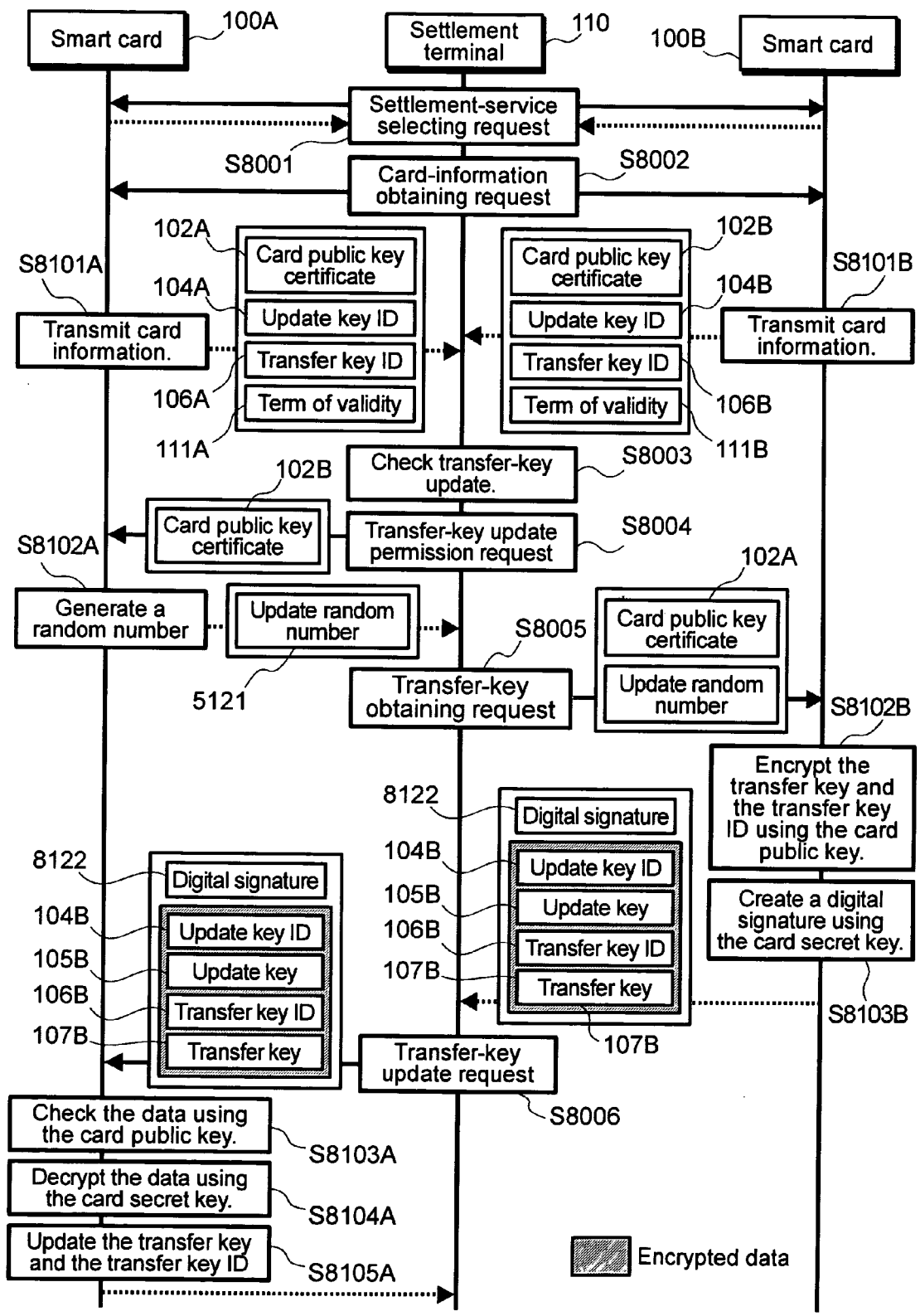
FIG. 18 is a flowchart illustrating transfer key update processing using the public-key cryptography according to the fifth embodiment.

As is the case with the step S7003, a check is made in the step S8003 as to whether or not the update key ID 104A is equivalent to the update key ID 104B. FIG. 18 illustrates a process flow in which public-key cryptography is used for update processing of a transfer key and an update key because the update key ID 104A differs from the update key ID 104B. Accordingly, the card secret key 103A and the card secret key 103B are used for the update processing of the transfer key and the update key. Processing after the step S8003 will be described below.

In a step S8004, the settlement terminal 110 transmits a transfer-key update permission request to the smart card 100A by use of an APDU command. This APDU command includes the card public key certificate 102B. In a step S8102A, upon receiving the card public key certificate 102B is the transfer-key update permission request, the smart card 100A checks an update card public key certificate 102B by use of the CA public key 101. If the check succeeds, the smart card 100A generates an update random number 8121. Then, the update random number 8121 is transmitted to the settlement terminal 110 by use of an APDU response. In this case, the update random number 8121 is used for dynamic authentication that prevents the transfer key 107A of the smart card 100A from being illegally rewritten by a fraudulent card. In this regard, any random-number generation algorithm may be used to generate the update random number 8121 in accordance with the present invention.

Next, in a step S8005, the settlement terminal 110 transmits a transfer-key obtaining request to the smart card 100B by use of an APDU command. This APDU command includes the card public key certificate 102A and the update random number 8121. In a step S8102B, upon receiving the card public key certificate 102A and the update random number 8121 as a transfer-key obtaining request, the smart card 100B first checks the card public key certificate 102A by use of the CA public key 101. If the check succeeds, the update key ID 104B, the update key 105B, the transfer key ID 106B and the transfer key 107B are encrypted using a card public key included in the card public key certificate 102A. Next, in a step S81033, a digital signature 8121 for data into which the update key ID 104B, the update key 105B, the transfer key ID 106B and the transfer key 107B are encrypted and the update random number 8122 are generated using the card secret key 103B. Then, the data into which the update key ID 104B, the update key 105B, the transfer key ID 106B and the transfer key 107B are encrypted, and the digital signature 8122, are transmitted to the settlement terminal 110 by use of an APDU response. Here, so long as the algorithm which in creating the digital signature 8122 is based on the public-key cryptography, any algorithm is within the scope of the present invention.

Next, in a step S8006, the settlement terminal 110 transmits a transfer-key update request to the smart card 100A by use of an APDU command. This APDU command includes the digital signature 8122, and the data into which the update key ID 104B, the update key 105B, the transfer key ID 106B and the transfer key 107B are encrypted. In a step S8103A, upon receiving, as update processing of a transfer key, the digital signature 8122 and the data into which the update key ID 104B, the update key 105B, the transfer key ID 106B and the transfer key 107B are encrypted, the smart card 100A first checks the digital signature 8122 by use of the card public key 102B. If the check succeeds, the dynamic authentication is considered to have succeeded. Then, in a step S8104A, the update key ID 104B, the update key 105B, the transfer key ID 106B, and the transfer key 107B are decrypted by use of the card secret key 103A. After that, the process proceeds to a step S8105A. In this processing, a check is made as to whether or not the value of the update key ID 104B is between a value of the upper limit of update key ID 113A and that of the update key ID 104A, and at the same time, the value of the transfer key ID 106B is between a value of the upper limit of transfer key ID 112A and that of the transfer key ID 106A. If the check fails, the transfer key is not updated. If the check succeeds, the values of the update key ID 104A and the update key 105A are updated to values of the update key ID 104B and the update key 105B, respectively. In addition, the values of the transfer key ID 106A and the transfer key 107A are updated to values of the transfer key ID 106B and the transfer key 107B, respectively.

In the steps described above, the steps S8001, S8002, S8003, S8004, S8005, and S8006 are performed by the settlement program 305 that is executed by the operation control means 303 of the settlement terminal 110. In addition, the steps S8101A, S8102A, S8103A, S8104A, and S8105A are performed by the settlement program 205A that is executed by the operation control means 203A of the smart card 100A. Further, the steps S8101B, S8102B, and S8103B are performed by the settlement program 205B that is executed by the operation control means 203B of the smart card 100B.

As a result of the steps described above, the transfer key can be securely updated to a newer value. In the fifth embodiment according to the present invention, even if the transfer key of the smart card 100A differs from that of the smart card 100B, if both cards share the same update key, it is possible to update values of transfer keys in both cards to new values by use of the update key. In addition, even if both cards do not share the same update key, using the card public key and the card secret key enables updating of values of the update keys and values of the transfer keys in both cards to new values. For example, when changing a smart card whose term of validity expires, to a new smart card, also updating a transfer key to a new value permits a value of a transfer key of an old smart card, from which the value transfer to this new smart card is performed, to be updated to a new value by use of an update key. In this case, since the transfer key is updated using common-key cryptography, it is possible to complete the processing in a short time. Moreover, when changing to a new smart card, the value of the update key can also be updated to a new value. In this case, although the update key of the old card differs from that of the new card, using the card public key and the card secret key enables update of the updating key and the transfer key.

It is to be noted that although the upper limit of transfer key ID is set in the description of each embodiment described above, it is not an indispensable condition. If the upper limit of transfer key ID is not set, updating becomes possible any number of times. Therefore, a smart card can be used for a long time. On the other hand, if the upper limit of the transfer key ID is set as described above, it is possible to provide a smart card with a fixed term of validity, which enables the reclamation of the smart card when the upper limit is reached.

In addition, as described for each embodiment of the invention, it is possible to improve the security of the whole system according to the present invention. However, for example, in the event that a transfer key has leaked out from a certain system, the security is threatened in the conventional system in which the transfer key cannot be updated. To recover the security, it is necessary to reclaim all smart cards so as to set a new transfer key. On the other hand, according to the present invention, since a transfer key can be updated as preprocessing of the value transfer, it is possible to set a new transfer key without reclaiming all smart cards. Thus, even in the event that a transfer key has leaked out by some rare accident, the security can be easily recovered. Further, regardless of the case where a transfer key leaks out, if a transfer key is updated periodically, higher security can be achieved.

As described above, according to the present invention, when common-key cryptography is used for value transfer between smart cards, it is possible to provide a smart card and a settlement terminal, which can improve the security of the whole system, by enabling easy updating of a cryptographic key used for the value transfer.

While we have shown and described several embodiments in accordance with our invention, it should be understood that the disclosed embodiments are susceptible of changes and modifications without departing from the scope of the invention. Therefore, we do not intend to be bound by the details shown and described herein, but intend to cover all such changes and modifications fall within the ambit of the appended claims.

We claim:

1. A smart card, comprising:
a communication unit to communicate with the outside;
an information accumulating unit to accumulate data and a program; and
an arithmetic processing unit to perform information processing,
wherein said information accumulating unit stores value data, a transfer key that encrypts the value data, a transfer key identifier that verifies whether the transfer key is newer or older in accordance with a value of the transfer key identifier, an update key that encrypts the transfer key, and an upper limit of the transfer key identifier that represents an upper limit of the transfer key identifier that can be stored by the smart card,
wherein said arithmetic processing unit updates the transfer key identifier and the transfer key by performing encryption using the update key on the basis of common-key cryptography,
wherein said arithmetic processing unit updates the value data by performing encryption using the transfer key on the basis of the common-key cryptography,
wherein if command data that requests transmission of card information is received, said arithmetic processing unit transmits said transfer key identifier to the outside as response data,
wherein if command data that requests update permission of said transfer key is received, said arithmetic processing unit generates a first random number and transmitting said first random number to the outside as response data,
wherein if command data which requests to obtain said transfer key, and which stores a second random number, is received, said arithmetic processing unit transmits first encrypted data, into which the second random number, said transfer key identifier, and said transfer key are encrypted by use of said update key on the basis of common-key cryptography, to the outside as response data, and
wherein if command data which requests update of said transfer key, and which stores second encrypted data, is received, said arithmetic processing unit decrypts said second encrypted data by use of said update key on the basis of common-key cryptography to extract first data, second data, and third data, and if said first data is equivalent to said first random number, and if a value of said second data is between a value of said upper limit of transfer key identifier and a value of said transfer key identifier, changes a value of said transfer key identifier to a value of said second data, and chances a value of said transfer key to a value of said third data.

2. A smart card, comprising:
a communication unit to communicate with the outside;
an information accumulating unit to accumulate data and a program; and
an arithmetic processing unit to perform information processing,
wherein said information accumulating unit stores value data, a transfer key that encrypts the value data, a transfer key identifier that verifies whether the transfer key is newer or older in accordance with a value of the transfer key identifier, a first public key certificate including a first public key, which encrypts the transfer key, a secret key corresponding to the first public key, and an upper limit of transfer key identifier that represents an upper limit of the transfer key identifier which can be stored by the smart card, wherein said arithmetic processing unit updates the transfer key identifier and the transfer key by performing encryption using the first public key certificate and the secret key on the basis of public-key cryptography, wherein said arithmetic processing unit updates the value data by performing encryption using the transfer key on the basis of common-key cryptography, wherein if command data that requests transmission of card information is received, said arithmetic processing unit transmits said transfer key identifier and said first public key certificate to the outside as response data, wherein if command data which requests update permission of said transfer key, and which stores a second public key certificate including a second public key, is received, said arithmetic processing unit generates a first random number and transmitting said first random number to the outside as response data, wherein if command data which requests to obtain said transfer key, and which stores a second random number and a third public key certificate including a third public key, is received, said arithmetic processing unit first creates first encrypted data into which said transfer key identifier and said transfer key are encrypted by use of said third public key on the basis of public-key cryptography, next creates first digital signature data from said first encrypted data and said second random number by use of said secret key on the basis of public-key cryptography, and lastly transmits said first encrypted data and said first digital signature data to the outside as response data, and wherein if command data which requests update of said transfer key, and which stores second encrypted data and second digital signature data, is received, said arithmetic processing unit first checks said second digital signature data by use of said second public key on the basis of public-key cryptography, next decrypts the second encrypted data by use of said secret key on the basis of public-key cryptography to extract first data and second data, and lastly if a value of the first data is between a value of said upper limit of transfer key identifier and a value of said transfer key identifier, changes a value of said transfer key identifier to a value of said first data, and a value of said transfer key to a value of said second data.

3. A smart card, comprising:
a communication unit to communicate with the outside;
an information accumulating unit to accumulate data and a program; and
an arithmetic processing unit to perform information processing, wherein said information accumulating unit stores value data, a transfer key that encrypts the value data, a transfer key identifier that verifies whether the transfer key is newer or older in accordance with a value of the transfer key identifier, an update key that updates the transfer key, an update key identifier that verifies whether the update key is newer or older in accordance with a value of the update key identifier, a first public key certificate including a first public key, which encrypts the transfer key, a secret key corresponding to the first public key, and an upper limit of transfer key identifier that represents an under limit of the transfer key identifier which can be stored by the smart card, wherein said arithmetic processing unit updates the transfer key by use of the update key on the basis of common-key cryptography, or updates the transfer key by use of the first public key certificate and the secret key on the basis of common-key cryptography, wherein said arithmetic processing unit updates the value data by performing encryption using the transfer key on the basis of the common-key cryptography, wherein if command data that requests transmission of card information is received, said arithmetic processing unit transmits said transfer key identifier, said update key identifier, and said first public key certificate to the outside as response data, wherein if command data that requests update permission of said transfer key is received, said arithmetic processing unit generates a first random number and transmits said first random number to the outside as response data, wherein if command data which requests to obtain said transfer key, and which stores a second random number, is received, said arithmetic processing unit transmits first encrypted data, into which said second random number, said transfer key identifier, and said transfer key are encrypted by use of said update key on said basis of common-key cryptography, to outside as response data, and wherein if command data which requests update of said transfer key, and which stores second encrypted data, is received, said arithmetic processing unit first decrypts said second encrypted data by use of said update key on said basis of common-key cryptography to extract first data, second data, and third data, and next if the first data is equivalent to the first random number, and if a value of the second data is between a value of the upper limit of transfer key identifier and a value of the transfer key identifier, chances a value of the transfer key identifier to a value of the second data, and changes a value of the transfer key to a value of the third data.

4. A smart card, comprising:
a communication unit to communicate with the outside;
an information accumulating unit to accumulate data and a program; and
an arithmetic processing unit to perform information processing, wherein said information accumulating unit stores value data, a transfer key that encrypts the value data, a transfer key identifier that verifies whether the transfer key is newer or older in accordance with a value of the transfer key identifier, an update key that updates the transfer key, an update key identifier that verifies whether the update key is newer or older in accordance with a value of the update key identifier, a first public key certificate including a first public key, which encrypts the transfer key, a secret key corresponding to the first public key, and an upper limit of transfer key identifier that represents an upper limit of the transfer key identifier which can be stored by the smart card, wherein said arithmetic processing unit updates the transfer key by use of the update key on the basis of common-key cryptography, or updates the transfer key by use of the first public key certificate and the secret key on the basis of common-key cryptography, wherein said arithmetic processing unit updates the value data by performing encryption using the transfer key on the basis of the common-key cryptography, wherein if command data that requests transmission of card information is received, said arithmetic processing unit transmits said transfer key identifier, said update key identifier, and said first public key certificate to the outside as response data, wherein if command data which requests update permission of said transfer key, and which stores a second public key certificate including a second public key, is received, said arithmetic processing unit generates a first random number and transmitting said first random number to the outside as response data, wherein if command data which requests to obtain said transfer key, and which stores a second random number and a third public key certificate including a third public key, is received, said arithmetic processing unit first creates first encrypted data into which said transfer key identifier and said transfer key are encrypted by use of said third public key on the basis of public-key cryptography, next creates first digital signature data from said first encrypted data and the second random number by use of the secret key on the basis of public-key cryptography, and lastly transmits said first encrypted data and the first digital signature data to outside as response data, and wherein if command data which requests update of said transfer key, and which stores second encrypted data and second digital signature data, is received, said arithmetic processing unit first verifies the second digital signature data by use of said second public key on the basis of public-key cryptography, next decrypts said second encrypted data by use of said secret key on the basis of public-key cryptography to extract first data and second data, and lastly if a value of the first data is between a value of the upper limit of transfer key identifier and a value of said transfer key identifier, changes a value of said transfer key identifier to a value of the first data, and changes a value of said transfer key to a value of the second data.

5. A smart card, comprising:

a communication unit to communicate with the outside;

an information accumulating unit to accumulate data and a program; and an arithmetic processing unit to perform information processing, wherein said information accumulating unit stores value data, two or more transfer keys that encrypts the value data, a transfer key identifier that includes a selection transfer key identifier that identifies the transfer key currently selected, and that identifies said two or more transfer keys, and an update key used to update the transfer key, wherein if the value of the transfer key identifier, which is received by said communication unit, is newer than that of said selection transfer key identifier, and which is equivalent to either a value of said transfer key identifier stored by said information accumulating unit, said arithmetic processing unit updates said selection transfer key identifier to the transfer key identifier received by said communication unit by performing encryption using the update key on the basis of common-key cryptography, wherein said arithmetic processing unit updates the value data by performing encryption using the transfer key corresponding to the update transfer key identifier on the basis of common-key cryptography, wherein if command data that requests transmission of card information is received, said arithmetic processing unit transmits said selection transfer key identifier to the outside as response data, wherein if command data that requests update permission of the transfer key is received, said arithmetic processing unit generates a first random number and transmitting the first random number to the outside as response data, wherein if command data which requests to obtain the transfer key, and which stores a second random number, is received, said arithmetic processing unit transmits first encrypted data, into which said second random number, said selection transfer key identifier are encrypted by use of said update key on the basis of common-key cryptography, to the outside as response data, and wherein if command data which requests update of the transfer key, and which stores second encrypted data, is received, said arithmetic processing unit decrypts the second encrypted data by use of the update key on the basis of common-key cryptography to extract first data, second data, and if the first data is equivalent to the first random number, and if a value of the second data which is equivalent to one of values of said transfer key identifiers, and which is newer than that of said selection transfer key identifier used to identify said transfer key currently selected, changes a value of said selection transfer key identifier to a value of the second data.

* * * * *